United States Patent
D'Alelio

[11] 3,888,844
[45] June 10, 1975

[54] HALOGENATED ESTERS OF PHOSPHORUS-CONTAINING ACIDS (II)

[76] Inventor: Gaetano F. D'Alelio, 2011 E. Cedar St., South Bend, Ind. 46617

[22] Filed: July 30, 1973

[21] Appl. No.: 383,600

Related U.S. Application Data

[63] Continuation-in-part of Ser. No. 179,543, Sept. 10, 1971, Pat. No. 3,780,144, which is a continuation-in-part of Ser. No. 785,335, Dec. 19, 1968, abandoned.

[52] U.S. Cl............. 260/214; 260/47 R; 260/57 R; 260/59; 260/75 R; 260/85.5 R; 260/86.1 R; 260/87.3; 260/88.2 C; 260/89.7 R; 260/89.5 A; 260/89.5 H; 260/91.1 M; 260/91.3 PV; 260/93.5 R; 260/219; 260/944; 260/951; 260/956; 260/969; 260/984
[51] Int. Cl............................................... C08b 3/00
[58] Field of Search . 260/219, 214, 89.5 H, 89.5 A, 260/93.5 R, 91.1 M, 89.7 R, 75 R, 47 R, 91.3 PV, 88.2 C, 87.3, 86.1 R, 85.5 R, 57, 59

[56] References Cited
UNITED STATES PATENTS
3,553,194    1/1971    Verbanac et al. ................. 260/219

OTHER PUBLICATIONS
Kirk–Othmer, Encyclopedia of Chemical Technology, 2nd Ed., Vol. 4, 1964, pp. 593–595.

Primary Examiner—Melvyn I. Marquis
Attorney, Agent, or Firm—Walter J. Monacelli

[57] ABSTRACT

This invention deals with new phosphorus containing polymeric esters having pendent groups therein of the formula

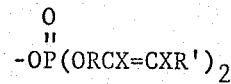

obtained by the reaction of a polymer having at least 2 and preferably at least 4 hydroxy groups therein with a phosphorus-halogen compound of the formula $XP(O)(ORCX{=}CXR')_2$ wherein:

R represents a divalent hydrocarbon radical containing 1-20 carbon atoms;
R' represents X, hydrogen or R'';
R'' represents a monovalent hydrocarbon radical containing 1-20 carbon atoms; and
X represents chlorine or bromine. Somewhat related polymers are also disclosed as derived by the reaction of

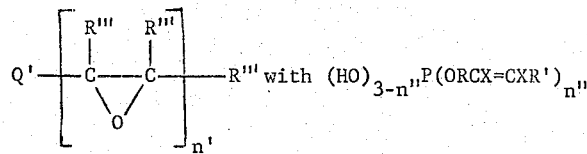

wherein Q' is an organic moiety, n' has a value of at least one, n'' is one or two, R''' represents hydrogen or a monovalent hydrocarbon group of 1-20 carbon atoms, and the other symbols have the same meaning as defined above.

Also disclosed are the reaction products of the phosphite compound $HOP(ORCX{=}CXR')_2$ with an aldehyde and an organic nitrogen compound having one or two hydrogen atoms on the nitrogen, or with a compound having an ethylenic group therein.

These new ester polymers and compounds are useful particularly as fire retardants, agricultural chemicals, fuel additives, plasticizers, monomers and intermediates for the synthesis of other useful derivatives.

30 Claims, No Drawings

HALOGENATED ESTERS OF PHOSPHORUS-CONTAINING ACIDS (II)

This application is a continuation-in-part of copending application Ser. No. 179,543, filed Sept. 10, 1971 issued Dec. 18, 1973, as U.S. Pat. No. 3,780,144, which in turn is a continuation of application Ser. No. 785,335, filed Dec. 19, 1968, now abandoned.

BACKGROUND OF THE INVENTION

1. Field of the Invention:

This invention involves new esters containing both phosphorus and halogen atoms in their structures. More specifically, it concerns the phosphate esters of halogenated acetylenic alcohols. It also concerns polymeric derivatives of such esters.

2. Related Prior Art:

No pertinent prior art is known.

STATEMENT OF THE INVENTION

The polymeric esters of this invention have at least two and preferably at least 4 repeating units having pendent groups attached thereto of the formula:

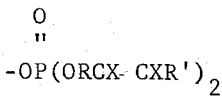

wherein

R represents a divalent hydrocarbon radical containing 1–20 carbon atoms;

R' represents X, hydrogen or R'';

R'' represents a monovalent hydrocarbon radical containing, 1–20 carbon atoms; and X represents chlorine or bromine.

The polymeric esters of this invention are prepared readily by the following reaction using one mole of phosphorus-containing reagent per hydroxy group in the polymer starting molecule:

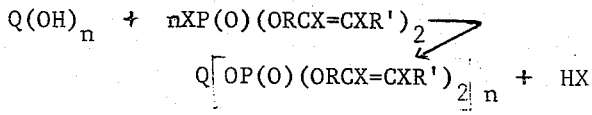

wherein Q is a polyvalent organic moiety and $n$ has a value of at least 2. Advantageously a tertiary amine is used in approximately molar amounts to form an amine hydrohalide which is easily removed from the reaction mass by precipitation from an inert solvent, such as toluene, used as the reaction medium or added after reaction to dissolve the reaction product. Where it may be desired to react less than all of the hydroxy groups in the starting polymer, then the amount of phosphorus-containing reagent is reduced proportionately to the molar equivalent of the number of hydroxy groups desired to be reacted, this number being at least two and preferably at least four per polymer molecule. In the above formulas, Q is an organic moiety or the polymeric residue from which the hydroxy groups extend, and n is an integer having a value of at least 2, preferably at least 4 and in high molecular weight polymers may have a value of 100 or even much higher.

Somewhat related products having fire-retardant properties are also produced by the reaction of an epoxide having the formula

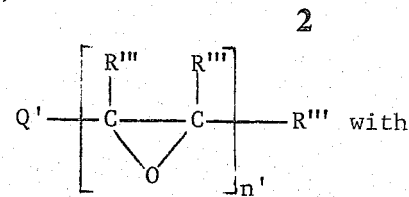

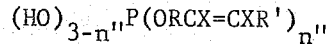

wherein

Q' represents the residue or organic moiety of an epoxide;

n' is an integer having a value of at least one, and may be 100 or even higher;

n'' represents one or two;

R''' represents hydrogen or a monovalent hydrocarbon group of 1–20 carbon atoms; and R, R' and X are as defined above.

Products of fire-retardant properties are also prepared by the reaction HOP(ORCX=CXR') with an aldehyde and an organic nitrogen compound having one or two hydrogen atoms attached to a nitrogen atom therein or with a compound having a >C=C< moiety.

The divalent hydrocarbon radical represented by R in the above formulas can be aliphatic, cycloaliphatic or aromatic and can be saturated or have ethylenic or acetylenic unsaturation therein. Aliphatic radicals include aryl-substituted aliphatic radicals such as phenylethylene, phenylenedimethylene, etc.; aromatic radicals include alkyl, alkenyl and alkynyl substituted aromatic radicals such as tolylene, xylylene, ethylphenylene, vinylphenylene, propargylphenylene, etc.; and cycloaliphatic radicals include alkyl, alkenyl, alkynyl and aryl substituted cycloaliphatic radicals such as ethylcyclohexylene, vinylcyclohexylene, propargylcyclohexylene, phenylcycloheptylene, tolylcyclopentylene, etc. The simpler and smaller of these radicals are preferred for obvious reasons, but the more complicated radicals can also be used and are included in the scope of this invention.

These divalent hydrocarbon radicals are illustrated by the following typical radicals: —CH₂—; —(CH₂)₂—; —(CH₂)₄—; —(CH₂)₇—; —(CH₂)₁₂—; —C(CH₃)₂—; —CH(CH₃)—; —CH(C₆H₅)—; —CH(C₆H₁₁)—; —CH(C₄H₉)—; —CH(C₈H₁₇)—; —CH₂CH(C₆H₅CH₃)—; —CH(CH₃)CH₂CH₂—; —CH₂CH=CHCH₂—; —CH₂C≡CCH₂—; —CH₂CH(CH=CH₂)—; —CH(C≡CH)CH₂—; —CH(CH₂C₆H₅)CH₂—; —CH₂C₆H₄CH₂—; —CH₂CH₂C₆H₄—; —C₆H₄—; —C₆H₃(CH₃)—; —C₁₀H₆—; —C₁₀H₅(C₂H₅)—; —C₆H₃(CH=CH₂)—; —C₆H₃(CH₂C≡CH)—; —C₆H₄—C₆H₄—; —C₆H₄(C₆H₅)—; —C₆H₁₀—; —C₅H₈—; —C₇H₁₂—; —C₆H₉(CH₃)—; —C₆H₉(C₆H₅)—; —C₆H₉(CH=CH₂)—; —C₇H₁₁(CH₂C≡CH)—; —CH₂C₆H₁₀CH₂—; —CH₂CH₂C₆H₁₀—; —(CH₂)₈CH=CH(CH₂)₁₀—; and the like.

The monovalent hydrocarbon radical represented by R'' in the above formulas can be aliphatic, cycloaliphatic or aromatic and can be saturated or have ethylenic or acetylenic unsaturation therein. Aliphatic radicals include arylsubstituted aliphatic radicals such as phenylethyl, diphenylethyl, benzyl, tolylethyl, etc.; aromatic radicals include alkyl, alkenyl, and alkynyl substituted aromatic radicals such as tolyl, xylyl, ethylphenyl, vinylphenyl, propargylphenyl, etc.; and cycloaliphatic radicals include alkyl, alkenyl, alkynyl and aryl substituted cycloaliphatic radicals such as ethylcyclohexyl, vinylcyclohexyl, propargylcyclohexyl, phenylcycloheptyl, tolylcyclopentyl, etc. The simpler and smaller of these radicals are preferred for obvious reasons, but the more complicated radicals can also be used and are included in the scope of this invention.

These monovalent hydrocarbon radicals are illustrated by the following typical radicals: $-CH_3$; $-C_2H_5$; $-C_4H_9$; $-CH=CH_2$; $-(CH_2)_7CH_3$; $-(CH_2)_{12}CH_3$; $-CH(CH_3)_2$; $-CH(C_6H_5)_2$; $-CH_2CH=CH_2$; $-CH_2C\equiv CH$; $-CH_2C_6H_{11}$; $-CH_2CH_2C_6H_5CH_3$; $-CH(CH_3)CH_2CH_3$; $-CH_2CH_2CH=CH_2$; $-CH(C\equiv CH)CH_3$; $-CH(CH_2C_6H_5)CH_3$; $-CH_2C_6H_4CH_3$; $-CH_2C_6H_5$; $-CH_2CH_2C_6H_5$; $-C_6H_5$; $-C_6H_4CH_3$; $-C_6H_3(CH_3)_2$; $-C_{10}H_7$; $-C_{10}H_6C_2H_5$; $-C_6H_4CH=CH_2$; $-C_6H_4CH_2C\equiv CH$; $-C_6H_4-C_6H_5$; $-C_6H_3(C_6H_5)_2$; $-C_6H_{11}$; $-C_5H_9$; $-C_7H_{13}$; $-C_6H_{10}CH_3$; $-C_6H_{10}C_6H_5$; $-C_6H_{10}CH=CH_2$; $-C_7H_{12}CH_2C\equiv CH$; $-CH_2C_6H_{10}CH_3$; $-CH_2CH_2C_6H_{11}$; $-(CH_2)_8CH=CH(CH_2)_9CH_3$; and the like.

The hydroxy polymers with which the $XP(O)(ORCX=CXR')_2$ is reacted in accordance with the practice of this invention comprise a variety of polymeric materials. These include a number of addition polymers and copolymers, condensation polymers and natural occurring polymers having hydroxy groups attached to the polymer molecules and available for reacting. These polymers may have many more hydroxy groups than are desired for the number of phosphorus-halogen groups to be added, and it may be desirable in such case to have many of the hydroxy groups unreacted or prereacted or postreacted with other reagents so as to have various other pendent groups in the resultant polymer such as hydroxy, ether, ester, etc.

For example, polymers suitable for the purpose of this invention include polymeric (hydroxyhydrocarbon) esters of acrylic, methacrylic and betachloroacrylic acids in which the hydroxyhydrocarbon portion of the ester may be aliphatic, aromatic, cycloaliphatic, saturated or unsaturated, and have 1–20 carbon atoms in the hydrocarbon portion. Typical polymers of this type are poly(betahydroxyethyl)acrylate, poly(betahydroxypropyl)acrylate, poly(betahydroxybutyl)acrylate, poly(4-hydroxybutyl)acrylate, poly(monoglyceryl)methacrylate, poly(p-hydroxyphenyl)acrylate, poly(p-hydroxybenzyl)chloroacrylate, poly(p-methylolbenzyl)acrylate, poly(4-hydroxycyclohexyl)acrylate, poly(4-methylolcyclohexylmethyl)methacrylate, poly(4-ethylolphenylethyl)methacrylate, poly(4-hydroxynaphthyl)chloroacrylate, etc.; polystyrenes having various hydroxy-containing groups, such as poly-p-hydroxystyrene, poly-4-methylolstyrene, poly-4-ethylolstyrene, poly-3-ethylolstyrene, poly-4-(hydroxyethoxy)styrene poly-4-(hydroxyacetoxy)-styrene; poly-4-hydroxy-1-vinylnaphthalene, poly-4-ethylol-1-vinylnaphthalene, etc.; polymeric vinyl and other ethers, such as poly(ethylolvinyl ether), poly(isopropylolvinyl ether), poly(phenylolvinyl ether), poly(4-ethylolphenyl-vinyl ether), poly(isopropylol-isopropenyl ether), poly(4-hydroxycyclohexyl-vinyl ether), poly(4-ethylolcyclohexyl-vinyl ether),

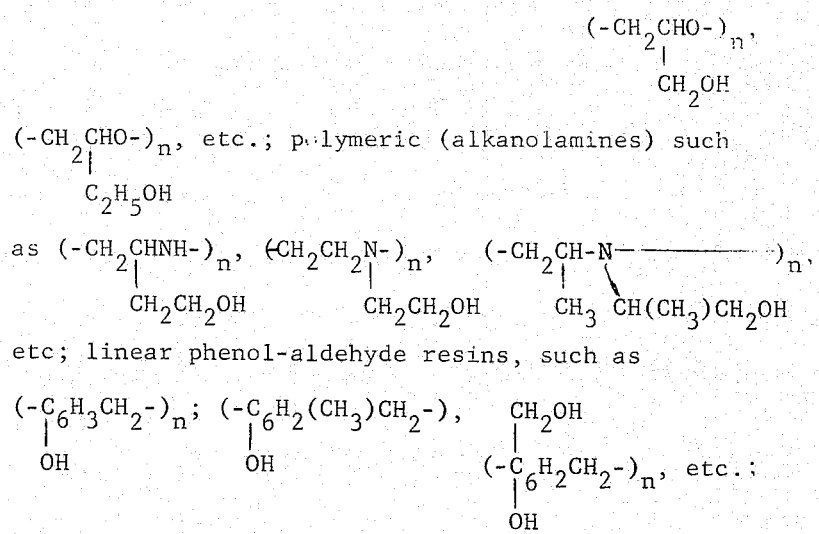

polymeric polyesters having unreacted hydroxy groups such as the condensation products of polyols and polycarboxylic acids, for example condensation polymers of glycerine, glycols, pentaerythritol, trimethylolpropane, hydroquinone, di- and trihydroxynaphthalene, etc. with dibasic acids or their anhydrides such as succinic, adipic, maleic, fumaric, itaconic, phthalic, isophthalic, etc. These glycols and dibasic acids may be represented by the formulas $R(OH)_2$ and $R(COOH)_2$ respectively. The hydroxy groups are made available by using an excess of the glycol to give terminal hydroxy groups on the polymer chain or by using an appropriate proportion of a trifunctional or tetrafunctional polyol or polycarboxylic acid so as to provide pendent groups having hydroxyls as well as terminal hydroxyls. Thus, a mixture of glycol and glycerine with a limited amount of succinic acid will give unreacted pendent and terminal hydroxyl groups for the purpose of this invention. Typical hydroxy-containing condensation polymers may be represented by the repeating unit formulas $HO[ROC(O)RC(O)O]_nROH$ and where a proportion of trihydroxy alcohol or tribasic acid is used there will also be contained repeating units of the formula $$-\underset{\underset{OH}{|}}{R}OC(O)RC(O)O-$$

or

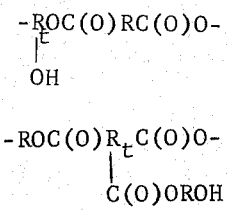

in which R is the divalent group defined above and $R_t$ is a corresponding trivalent group.

Also suitable as the hydroxy polymers for the purpose of this invention are polyvinyl alcohol, as such or partially etherified or esterified so as to have in addition to the hydroxy groups any desired number of ether groups such as ethyl, vinyl, propyl, isopropenyl, butyl, decyl, styryl, phenyl, benzyl, phenethyl, tolyl, cyclohexyl, etc. or ester groups such as acetate, butyrate, acrylate, benzoate, cyclohexoylformate, etc.; cellulose, both natural and regenerated, and with or without partial substitution with ether or ester groups, such as methyl cellulose, ethyl cellulose, benzyl cellulose, butyl cellulose, cellulose acetate, cellulose butyrate acetate, etc. cellulose benzoate, cellulose acrylate, etc.

Cellulose may be represented by the following repeating unit structure:

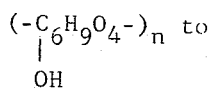

to indicate the availability of at least one hydroxy group per repeating unit. The cellulose derivatives listed above also have other repeating units as follows, with the relative proportions of the various types of repeating units depending on the degree of substitution in the cellulose:

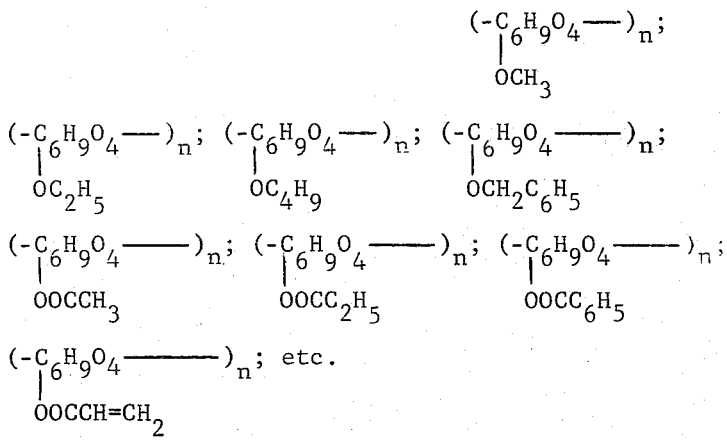

After the reaction is performed in accordance with the practice of the invention, the reacted cellulose repeating units may be represented as

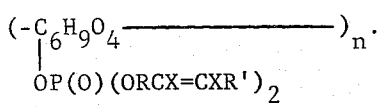

In addition, unreacted repeating units will also be present and where some of the repeating units are prereacted or postreacted or indicated above such other substituted repeating units will also be present, the relative proportions of the respective repeating units depending on the degree of substitution effected. For the purpose of reaction above raction at least two —OP(O)-(ORCX=CXR')$_2$ groups per polymer molecule are desired and, depending on the properties desired, as many as 100 percent of the repeating units may have such groups.

Where copolymers are used for the practice of this invention in which the comonomer repeating units have no hydroxy groups, such as derived from styrene, vinyl acetate, alkyl acrylates e.g., methyl methacrylate, methyl acrylate, methyl chloroacrylate, acrylonitrile, etc. it may be desirable to have the proportion or number of hydroxy-containing repeating units in the copolymer correspond to the number of phosphorus-halogen-containing repeating units to be in the ultimate polymer. In such case, all of the hydroxy groups are reacted with the phosphorus-halogen reagent.

The presence of the hydroxy-containing repeating unit and the resultant phosphorus-halogen-containing repeating unit imparts to the various types of polymers enumerated fire-retardant properties and other properties associated with the particular type of group attached by the practice of this invention. For this purpose there are at least two and preferably at least four repeating units of the phosphorus-halogen type per polymer molecule. For very high molecular weight copolymers there are at least two and preferably at least four such repeating units per 100 repeating units.

Repeating units of the acrylic type of polymers used as hydroxy starting polymers and the repeating units produced according to the practice of this invention can be illustrated as follows:

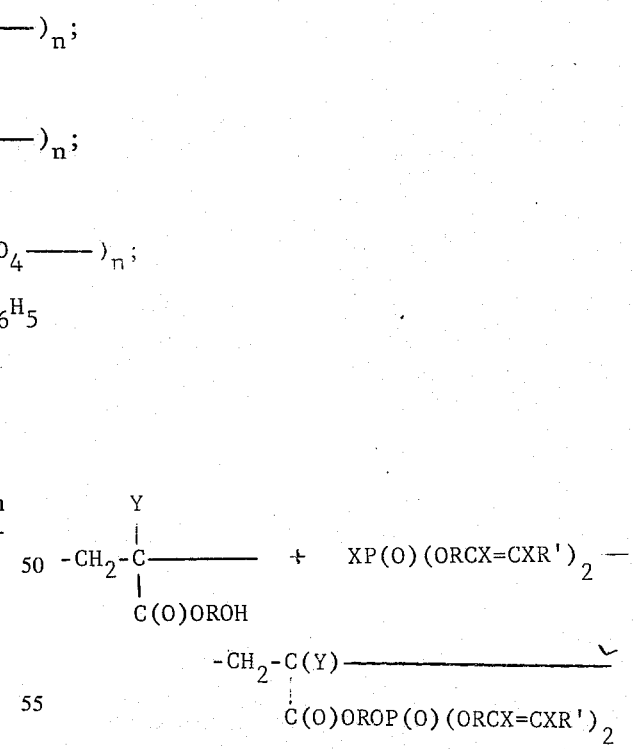

Y represents hydrogen, methyl or chlorine and the acrylic repeating unit may be that of a homopolymer or that in a copolymer with other non-hydroxy repeating units such as derived from styrene, methyl methacrylate, methyl acrylate, methyl chloracrylate, vinyl acetate, acrylonitrile, etc.

For example, a methyl methacrylate(betahydroxyethyl)acrylate copolymer may be represented as

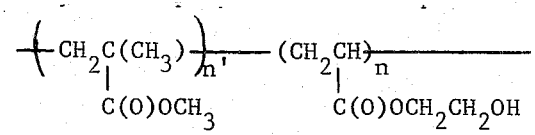

and where all the hydroxy groups are reacted the product is represented as

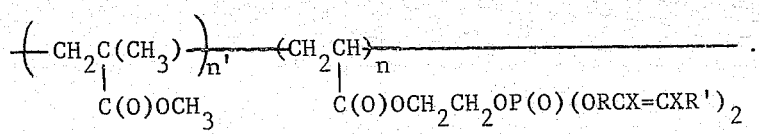

Although the two types of radicals are grouped together in separate parentheses, the actual distribution in the polymer is at random and one type is interspersed between the other type. Where the hydroxy groups are not completely reacted, the product will also contain these unreacted hydroxy-containing repeating units.

Various other specific types of hydroxy-containing can be illustrated as giving the following phosphorus-halogen repeating units:

(a) Hydroxystyrene:

$$-CH_2CH-$$
$$\phantom{-CH_2C}|$$
$$\phantom{-CH_2}C_6H_4OP(O)(ORCX=CXR')_2$$

(b) Methylolstyrene:

$$-CH_2CH-$$
$$\phantom{-CH_2}|$$
$$\phantom{-CH_2}C_6H_4CH_2OP(O)(ORCX=CXR')_2$$

(c) (Hydroxyacetoxy) styrene:

$$-CH_2CH-$$
$$\phantom{-CH_2}|$$
$$\phantom{-CH_2}C_6H_4OOCCH_2OP(O)(ORCX=CXR')_2$$

(d) Ethylol-vinyl ether:

$$-CH_2CH-$$
$$\phantom{-CH_2}|$$
$$\phantom{-CH_2}OC_2H_5OP(O)(ORCX=CXR')_2$$

(e) Phenylol-vinyl ether:

$$-CH_2CH-$$
$$\phantom{-CH_2}|$$
$$\phantom{-CH_2}OC_6H_4OP(O)(ORCX=CXR')_2$$

(f) $-CH_2CHO-$ :
    $\phantom{-CH_2}|$
    $\phantom{-CH}CH_2OH$ $$-CH_2CHO-$$
$$\phantom{-CH_2}|$$
$$\phantom{-CH_2}CH_2OP(O)(ORCX=CXR')_2$$

(g) $-CH_2CH_2N-$ :
    $\phantom{-CH_2CH}|$
    $\phantom{-CH_2}CH_2CH_2OH$ $$-CH_2CH_2N-$$
$$\phantom{-CH_2CH_2}|$$
$$\phantom{-CH_2}CH_2CH_2(ORCX=CXR')_2$$

(h) Phenol-formaldehyde linear resin:

$$-C_6H_3CH_2-$$
$$\phantom{-C_6H_3}|$$
$$\phantom{-C_6}OP(O)(ORCX=CXR')_2$$

(i) Glycol-glycerol-maleic copolymer:

$$-CH_2CH_2OOCCH=CHCOOCH_2CHCH_2OOCCH-CHCOO-$$
$$\phantom{-CH_2CH_2OOCCH=CHCOOCH_2CH}|$$
$$\phantom{-CH_2CH_2OOCCH=CHCOOC}OP(O)(ORCX=CXR')_2$$

(j) Partially hydrolyzed polyvinyl acetate:

$$-CH_2CH---CH_2CH---$$
$$\phantom{-CH_2}|\phantom{CH---CH_2}|$$
$$\phantom{-CH_2}OOCCH_3\phantom{CH}OP(O)(ORCX=CXR')_2$$

(k) Polyvinyl alcohol:

$$-CH_2CH-$$
$$\phantom{-CH_2}|$$
$$\phantom{-CH_2}OP(O)(ORCX=CXR')_2$$

The above reactions are advantageously conducted in the temperature range of 0° to 100° C., preferably 50°–100° C. When groups are present having a strong tendency to polymerize or crosslink, a polymerization inhibitor of the various well known types, such as t-butyl catechol, may advantageously be present.

While the reagents may be reacted with each other by intimate or direct comingling, it is generally preferred to use an inert solvent such as a hydrocarbon and where a reagent may not be soluble in such a solvent, the reagent may be held in suspension during the reaction by agitation of the mixture. Suitable solvents include benzene, toluene, xylene, hexane, decane, cyclohexane, naphtha, acetone, ethyl acetate, butyl acetate, tetrahydrofurane, dioxane, dimethylsulfoxide, dimethylformamide, dimethylacetamide, etc. with the boiling point of the solvent being at least as high as the temperature at which the reaction is to be conducted. With relatively low boiling solvents, the reaction may be conducted under pressure.

The period required to complete reaction varies according to the temperature used. For example at 100° C. a substantial amount of reaction is effected within 10 minutes, whereas at least 30 minutes, preferably at least one hour, is desired to effect substantial reaction at 0° C. In most cases a period of 1–5 hours is used to insure complete reaction.

The ($-ORCX=CXR'$) type of ester groups of this invention differ from the ester groups of halogenated saturated alcohols, for example ($-OCH_2CHXCH_2X$), in having much greater hydrolytic stability of the halogen atoms than the latter type of esters, which show a much greater tendency to lose halogen. This loss of halogen occurs under conditions of high humidity, thereby limiting the utility of the saturated compound.

The novel phosphorus-containing esters of this invention are self-extinguishing when ignited and thus are particularly useful as fire-retardant additives for a host of other materials and compounds, particularly those of a resinous or polymeric nature, for example, when added to polymethyl methacrylate, polystyrene, cellulose acetate, cellulose butyrate, the polyesters, the polyurethanes, rubbers, nylon and others. They can also be used as fire-retardant impregnants for porous bodies, such as paper, wood, fiberboard, cork, etc.

As organic compounds containing phosphorus and halogen atoms they are useful also as agricultural chemicals in the fields of insecticides, herbicides, pesticides, etc., as well as gasoline additives to function as metal scavengers for anti-knock gasolines containing organo-lead, -boron, or metallo-organo-compounds. Particularly are they useful as chemical intermediates in the synthesis of a host of other useful derivatives. The halo compounds can be halogenated further at the ethylenic double bond to produce higher halogenated compounds which have even greater self-extinguishing properties than the dihalo compounds. They also add to olefinic double bonds of unsaturated compounds to yield plasticizers as well as polymerizable monomers. They react with epoxy compounds to produce substituted alcohols which can be used as modifiers of urethane polymers, polyesters, cellulose, etc.

In addition to their flame retardant properties the compounds of this invention also find utility as agricultural chemicals and as fuel additives. In addition, when the parent compounds or derivatives contain functional groups, such as the OH groups, they can be used as modifiers in polymerization reactions or can be reacted with other functional molecules such as with the isocyanates, acid anhydrides, acid chlorides, oxirane compounds, etc., or when they contain an unsaturated olefinic group they can be homopolymerized or copolymerized with other monomers; or when they contain an amide group they can be reacted with aldehydes and polymerized alone or copolymerized with urea or melamine, or their methylol compounds can be reacted with cellulose or wool, etc.

The practice of this invention is illustrated by the following examples. These examples are given merely by way of illustration and are not intended to limit the scope of the invention in any way nor the manner in which the invention can be practiced. Unless specifically indicated otherwise, parts and percentages are given as parts and percentages by weight.

EXAMPLE I

One hundred forty-five parts of 1,2,3-trichloropropane are added to a solution of 106 parts of sodium carbonate dissolved in 900 parts of water and the mixture refluxed for ten hours. The water layer is then separated from the oily layer which is dried over anhydrous sodium carbonate, separated by filtration and distilled. There is obtained 115 parts of 2,3-dichloro-2-propene-1-ol, $ClCH=CClCH_2OH$, (I), b.p. 45°–46° C./1.5 mm; yield 91%.

EXAMPLE II a. To 250 parts of carbon tetrachloride is added 56 parts of propargyl alcohol (A) and to this solution there is added slowly, at room temperature, a solution of 160 parts of bromine in 250 parts of carbon tetrachloride and allowed to react at room temperature for 2 hours. Then the mixture is heated to 30°–40° C. for two hours. The product is distilled to recover the carbon tetrachloride and the 2,3-dibromo-2-propene-1-ol, $BrCH=CBrCH_2OH$, (II), b.p. 51°–52′ C./0.7 mm; yield 93%.

b. Treatment of 1,2,3-tribromopropene with aqueous sodium carbonate by the procedure of Example I yields the same 2,3-dibromo-2-propene-1-ol.

EXAMPLE III

The reaction of 2-methyl-3-butyn-2-ol (B) with NaOCl under an inert atmosphere of nitrogen according to the procedure given in the Bull. soc. chim. (France), p. 1615 (1965) gives an 87% yield of 4-chloro-2-methyl-3-butyn-2-ol,

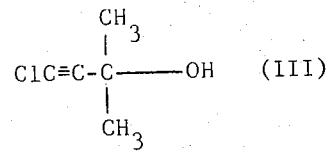

B.P. 54°–56° C./18 mm. This may be halogenated by the process of Example II to give the trihalo acetylenic alcohol $Cl(Br)C=C(Br)C(CH_3)_2OH$ or by similarly chlorinating to give $Cl_2C=C(Cl)C(CH_3)_2OH$.

EXAMPLE IV

The reaction of 2-methyl-3-butyn-2-ol in water with $Br_2$ and NaOH by the procedure given in Ann. Chem. (Rome), 47, 118 (1957) yields 4-bromo-2-methyl-3-butyn-2-ol,

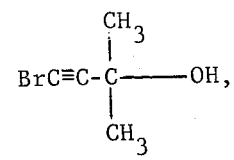

(IV), b.p. 92°–93° C./22 mm. This may be halogenated by the process of Example II to give the trihalo acetylenic alcohol $Br_2C=C(Br)C(CH_3)_2OH$.

EXAMPLE V

The procedure of Example II(a) is repeated using instead of propargyl alcohol, one equivalent weight of the following acetylenic alcohols to obtain the haloderivative corresponding to the alcohol used:

| Acetylenic Alcohol | | Dibromoethylene Derivative | |
|---|---|---|---|
| HC≡C—CH(CH₃)—OH | (C) | HC=C(Br)—C(Br)H—CH(CH₃)—OH | (V) |
| HC≡C—CH(C₂H₅)—OH | (D) | HC=C(Br)—C(Br)H—CH(C₂H₅)—OH | (VI) |
| HC≡C—CH(C₃H₇)—OH | (E) | HC=C(Br)—C(Br)H—CH(C₃H₇)—OH | (VII) |
| HC≡C—CH(C₄H₉)—OH | (F) | HC=C(Br)—C(Br)H—CH(C₄H₉)—OH | (VIII) |
| HC≡C—CH(C₈H₁₇)—OH | (G) | HC=C(Br)—C(Br)H—CH(C₈H₁₇)—OH | (IX) |
| HC≡C—CH(C₆H₅)—OH | (H) | HC=C(Br)—C(Br)H—CH(C₆H₅)—OH | (X) |
| HC≡C—C(CH₃)₂—OH | (B) | HC=C(Br)—C(Br)(CH₃)—C(CH₃)—OH | (XI) |
| HC≡C—C(CH₃)(C₂H₅)—OH | (I) | HC=C(Br)—C(Br)(CH₃)—C(CH₃)(C₂H₅)—OH | (XII) |

| Acetylenic Alcohol | | Dibromoethylene Derivative | |
|---|---|---|---|
| $HC \equiv C-\underset{\underset{C_4H_9}{\mid}}{\overset{\overset{CH_3}{\mid}}{C}}-OH$ | (J) | $H\overset{Br}{\overset{\mid}{C}}=\underset{\underset{C_4H_9}{\mid}}{\overset{\overset{Br}{\mid}}{C}}-\overset{\overset{CH_3}{\mid}}{C}-OH$ | (XIII) |
| $HC \equiv C-\underset{\underset{C_4H_9}{\mid}}{\overset{\overset{C_4H_9}{\mid}}{C}}-OH$ | (K) | $H\overset{Br}{\overset{\mid}{C}}=\underset{\underset{C_4H_9}{\mid}}{\overset{\overset{Br}{\mid}}{C}}-\overset{\overset{C_4H_9}{\mid}}{C}-OH$ | (XIV) |
| $H_3C-C \equiv C-CH_2OH$ | (L) | $CH_3\overset{\overset{Br}{\mid}}{C}=\overset{\overset{Br}{\mid}}{C}-CH_2OH$ | (XV) |
| $H_3C-C \equiv C-CH_2CH_2OH$ | (M) | $CH_3\overset{\overset{Br}{\mid}}{C}=\overset{\overset{Br}{\mid}}{C}-CH_2CH_2OH$ | (XVI) |
| $C_6H_5C \equiv C-(CH_2)_{10}OH$ | (N) | $C_6H_5\overset{\overset{Br}{\mid}}{C}=\overset{\overset{Br}{\mid}}{C}-(CH_2)_{10}OH$ | (XVII) |
| $H_{41}C_{20}C \equiv C-CH_2OH$ | (O) | $H_{41}C_{20}\overset{\overset{Br}{\mid}}{C}=\overset{\overset{Br}{\mid}}{C}-CH_2OH$ | (XVIII) |
| $H_3CC \equiv C-CH_2\overset{\overset{CH_3}{\mid}}{CH}-OH$ | (P) | $H_3C\overset{\overset{Br}{\mid}}{C}=\overset{\overset{Br}{\mid}}{C}-CH_2\overset{\overset{CH_3}{\mid}}{CH}-OH$ | (XIX) |
| $C_4H_9C \equiv C-CH_2OH$ | (Q) | $C_4H_9\overset{\overset{Br}{\mid}}{C}=\overset{\overset{Br}{\mid}}{C}-CH_2OH$ | (XX) |
| $C_6H_5C \equiv C-CH_2OH$ | (R) | $C_6H_5\overset{\overset{Br}{\mid}}{C}=\overset{\overset{Br}{\mid}}{C}-CH_2OH$ | (XXI) |
| $C_6H_5C \equiv C-CH_2CH_2OH$ | (S) | $C_6H_5\overset{\overset{Br}{\mid}}{C}=\overset{\overset{Br}{\mid}}{C}-CH_2CH_2OH$ | (XXII) |
| $C_6H_{11}C \equiv C-CH_2OH$ | (T) | $C_6H_{11}\overset{\overset{Br}{\mid}}{C}=\overset{\overset{Br}{\mid}}{C}-CH_2OH$ | (XXIII) |
| $C_6H_5C \equiv C-\overset{\overset{CH_3}{\mid}}{CH}-OH$ | (U) | $C_6H_5\overset{\overset{Br}{\mid}}{C}=\overset{\overset{Br}{\mid}}{C}-\overset{\overset{CH_3}{\mid}}{CH}-OH$ | (XXIV) |
| $C_6H_5C \equiv C-\underset{\underset{CH_3}{\mid}}{\overset{\overset{CH_3}{\mid}}{C}}-OH$ | (V) | $C_6H_5\overset{\overset{Br}{\mid}}{C}=\overset{\overset{Br}{\mid}}{C}-\underset{\underset{CH_3}{\mid}}{\overset{\overset{CH_3}{\mid}}{C}}-OH$ | (XXV) |
| $ClC \equiv C-\underset{\underset{CH_3}{\mid}}{\overset{\overset{CH_3}{\mid}}{C}}-OH$ | (III) | $Cl\overset{\overset{Br}{\mid}}{C}=\overset{\overset{Br}{\mid}}{C}-\underset{\underset{CH_3}{\mid}}{\overset{\overset{CH_3}{\mid}}{C}}-OH$ | (XXVI) |
| $BrC \equiv C-\underset{\underset{CH_3}{\mid}}{\overset{\overset{CH_3}{\mid}}{C}}-OH$ | (IV) | $Br\overset{\overset{Br}{\mid}}{C}=\overset{\overset{Br}{\mid}}{C}-\underset{\underset{CH_3}{\mid}}{\overset{\overset{CH_3}{\mid}}{C}}-OH$ | (XXVII) |
| $C_{10}H_7C \equiv CCH_2OH$ | (W) | $C_{10}H_7\overset{\overset{Br}{\mid}}{C}=\overset{\overset{Br}{\mid}}{C}-CH_2OH$ | (XXVIII) |

EXAMPLE VI a. To a solution of 56 parts of propargyl alcohol and 0.1 part of iodine in 300 parts of tetrachloroethylene is slowly passed chlorine gas while exposed to an ultraviolet lamp until 70 parts of chlorine are reacted. The halogenated product is then recovered by distillation and the majority of the product is identical to the 2,3-dichloro-2-propene-1-ol of Example I.

b. In a similar manner there is prepared

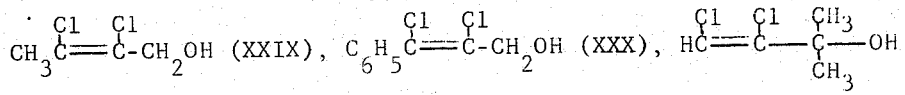

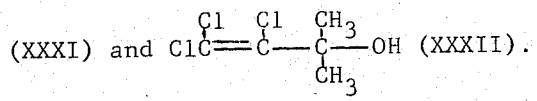

The halogenated acetylenic alcohols prepared in the above examples may be used in preparing the P(ORCX=CXR')₃ and from these the (ORCX=CXR')₂ reagents used for preparing the new compositions of this invention as illustrated in some of the following examples.

EXAMPLE VII a. The phosphite ester,

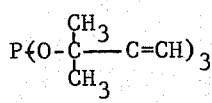

is prepared from PCl₃ and

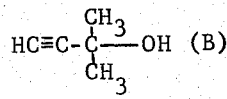

by the procedure given in U.S. Pat. No. 2,278,791, Dec. 27, 1955, and converted by the procedure of Example II(a) by reaction with $Br_2$ to

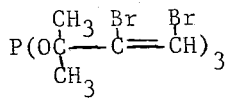

b. In a manner similar to the procedure of Example VII(a) the acetylenic alcohols III, IV, C, D, L and M are converted to the phosphite esters, $P(-ORC=CR)_3$, and by post bromination or chlorination to esters corresponding to the formula $P(ORCX=CXR')_3$.

c. To 73.85 parts of $P(OCH_2CBr=CHBr)_3$, prepared according to the procedure of paragraph (a), in 150 parts of toluene are added 13.6 parts of $SO_2Cl_2$ and the mixture is heated at 50° C. for 1 hour until no more $SO_2$ is liberated. There is obtained an almost quantitative yield of 55.32 parts of $ClP(O)(OCH_2CBr=CHBr)_2$ in toluene together with the byproduct, $ClCH_2CBr=CHBr$. This solution can be used as prepared for the synthesis of other derivatives, or it may be distilled to recover toluene and $ClCH_2CBr=CHBr$, leaving as a residue $ClP(O)(OCH_2CBr=CHBr)_2$.

EXAMPLE VIII a. A mixture of 51 parts of $POCl_3$, 126 parts of 2,3-dichloro-2-propene-1-ol, 59 parts of trimethylamine and 150 parts of toluene is refluxed for 3 hours. The mixture is then allowed to cool to room temperature and then filtered to remove precipitated trimethylamine hydrochloride. Then 3 parts of decolorizing carbon are added to the filtrate and allowed to stand with stirring for 8 to 24 hours. The solution is then filtered and the filtrate distilled at 0.5 to 14 mm Hg pressure to recover the toluene. The yield of almost colorless residue is 96% of the theoretical amount. The infrared spectra of the product confirm the absence of the band for the ester group. The product is a viscous oil insoluble in water but soluble in benzene and toluene. The elemental analyses of the product are in close agreement with the theoretical values for $P(O)(OCH_2CCl=CHCl)_3$. Other triesters of this type having other R groups in place of the $-CH_2-$ and/or having bromine in place of the chlorine are similarly prepared for use as intermediates in preparing phosphate esters of the present invention.

EXAMPLE IX

The $P(O)(ORCX=CXR')_3$ esters produced by the procedures of Example VIII are converted to $XP(O)(ORCX=CXR')_2$ compounds by reacting 2 moles of the $P(O)(ORCX=CXR')_3$ with one mole of $POX_3$ under a nitrogen atmosphere in a closed reactor at autogenous pressure and at 100° C. for about 3 hours. For example, 2 moles of $P(O)(OCH_2CCl=CHCl)_3$ are reacted with 1 mole of $P(O)Cl_3$ to give 3 moles of $ClP(O)(OCH_2CCl=CHCl)_2$.

EXAMPLE X a. To 51.25 parts of $ClP(O)(OCH_2CBr=CHBr)_2$ in 150 parts of ethyl acetate under a nitrogen atmosphere, there is slowly added at 20°–30° C. a solution containing 100 parts of ethyl acetate, 11.6 parts of a homopolymer of $CH_2=CHCOOCH_2CH_2OH$, having an average molecular weight of about 15,000, and 5.9 parts of trimethyl amine, and the mixture stirred for 3 hours. The precipitated amine hydrochloride $(CH_3)_3N\cdot HCl$ is removed by filtration, and the filtrate containing the product $CH_2=CHCOOCH_2CH_2OP(O)(OCH_2CBr=CHBr)_2$ is washed with distilled water until the washings are neutral. The ethyl acetate is removed from the product by distillation at reduced pressures leaving an almost quantitative yield of the product. Upon testing with a flame, it is found to be self-extinguishing upon withdrawal of the flame. The polymer product has a repeating unit structure of the formula

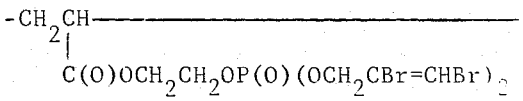

The phosphorus and bromine analyses and the absence of chlorine confirms this structure. When blended with a sample of the starting homopolymer in a proportion of 10 parts of product polymer per 90 parts of starting polymer, the self-extinguishing properties are still evident.

The procedure of paragraph (a) is repeated a number of times with similar results using individually equivalent amounts respectively of the following polymers with the amount of $ClP(O)(OCH_2CBr=CHBr)_2$ being reduced to 2.32 parts for (b), 3.5 for (c), 11.6 for (d) and 5.8 parts for (e):

b. Copolymer 80 moles styrene-20 moles (beta-hydroxyethyl)acrylate;

(c) Copolymer of 70 moles methyl methacrylate-30 moles (betahydroxyethyl)acrylate;

(d) Homopolymer of (betahydroxypropyl)methacrylate;

(e) Copolymer of 50 moles methyl methacrylate-50 moles (p-methylolphenyl)chloracrylate.

Similar results are obtained when $ClP(O)(OCH_2CCl=CHCl)_2$ is used as the phosphorus-halogen reagent in each of the foregoing procedures.

EXAMPLE XI

A copolymer of 50 molar parts of styrene and 50 molar parts of p-vinylbenzyl chloride and having an average molecular weight of about 25,000 is dissolved in toluene and the resultant solution agitated together with an aqueous solution of an excess of NaOH over the equivalent amount required for reaction with all the chlorine in the polymer. The mixture is agitated and reaction conducted at 50° C. for 1 hour. The resultant styrene-p-methylolstyrene copolymer solution in toluene is allowed to separate and is removed from the aqueous layer. A portion of the toluene solution containing 23.8 parts of the p-methylolstyrene-styrene copolymer is reacted according to the procedure of Example X using 33.45 parts of $ClP(O)(OCH_2CCl=CHCl)_2$. Analyses for phosphorus and chlorine in the product confirms the repeating unit

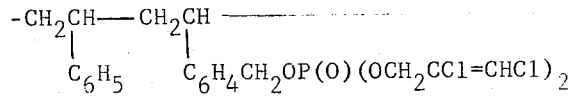

Flame testing shows this product to be self-extinguishing. when blended in a proportion of 10% with polystyrene and with polymethylmethacrylate respectively, the self-extinguishing properties are still evident. The foregoing procedure is repeated using 11 parts of the homopolymer of p-methylolstyrene prepared in a similar manner from the homopolymer of p-vinylbenzylchloride and the polymer obtained has the repeating unit structure of $$-CH_2CH-\underset{|}{\ }$$
$$C_6H_4CH_2OP(O)(OCH_2CCl=CHCl)_2$$

EXAMPLE XII a. A solution of a polyvinyl alcohol having an average molecular weight of about 20,000 dissolved in dimethyl sulfoxide (11 parts of polymer in 100 parts DMSO) is added gradually to a solution maintained at 20°–30° C. under a nitrogen atmosphere and containing 84 parts of ClP(O)(OCH$_2$CCl=CHCl)$_2$ and 15 parts of dimethyl amine in 100 parts of dimethylsulfoxide. The reaction solution is filtered and then dumped into a large volume of water (1000 parts or more). The polymer is thereby precipitated and residual trimethylamine hydrochloride remains in the water. The precipitated polymer is analyzed for phosphorus and chlorine and the analyses checks closely for a polymer having the repeating unit structure of $$-CH_2CH-\underset{|}{\ }$$
$$OP(O)(OCH_2CCl=CHCl)_2$$

b. When the above procedure is repeated using 32.5 parts of a 50%-hydrolyzed polyvinyl acetate instead of the polyvinyl acetate, a polymer product is obtained having the repeating unit structure of $$-CH_2CH-\ \ -CH_2CH-$$
$$\underset{OOCCH_3}{|}\ \ \ \underset{OP(O)(OCH_2CCl=CHCl)_2}{|}$$

c. The corresponding bromine derivatives are obtained when equivalent amounts respectively of ClP(O)(OCH$_2$CCl=CHBr)$_2$ or BrP(O)(OCH$_2$CCl=CHBr)$_2$ are used in the foregoing procedures. Each of the polymers of (a), (b) and (c) when tested with a flame is found to be self-extinguishing.

EXAMPLE XIII a. Cellulose fibers are steeped in a 10% aqueous NaOH solution at 5°–10° C. for 1 hour. Then the fibers are removed and squeezed dry. At this point the cellulose has one Na atom substituted per cellulose repeating unit. The treated cellulose fibers are added to a toluene solution at room temperature containing 36 parts of ClP(O)(CH$_2$CCl=CHCl)$_2$ per 18.4 parts of treated cellulose. The fibers are moved about in the solution periodically and kept in the solution for one hour. The fibers are then removed from the solution and washed several times with water to remove any byproduct NaCl still clinging to the fibers. The fibers are dried and analyzed for P and Cl. The analyses confirm the repeating unit structure $$-C_6H_9O_4-\underset{|}{\ }$$
$$OP(O)(OCH_2CCl=CHCl)_2$$

Flame testing shows the fibers to be self-extinguishing.

The above procedure is repeated a number of times using equivalent amounts of other XP(O)(ORCX=CXR')$_2$ compounds to give polymers having the following specific repeating units fitting the general repeating unit formula $$-C_6H_9O_4-\underset{|}{\ }$$
$$OP(O)(ORCX=CXR')_2$$

(b) $-C_6H_9O_4-$
    $\underset{|}{\ }$
    $OP(O)(OCH_2CH_2CBr=CBrCH_3)_2$ (c) $-C_6H_9O_4-$
    $\underset{|}{\ }$
    $OP(O)(OCH_2C_6H_4CH_2CCl=CClC_6H_5)_2$ (d) $-C_6H_9O_4-$
    $\underset{|}{\ }$
    $OP(O)(OC_6H_{10}CH_2CBr=CHBr)_2$ (e) $-C_6H_9O_4-$
    $\underset{|}{\ }$
    $OP(O)[OCH(CH_3)(CH_2)_4CH(CH_3)CCl=CClC_2H_5]_2$ (f) $-C_6H_9O_4-$
    $\underset{|}{\ }$
    $OP(O)(OC_6H_4CCl=CCl_2)_2$ When lower proportions of the phosphorus-halogen compounds are used there are lower proportions of the phosphorus-halogen repeating unit and more of the starting repeating units in the reacted polymer product. For noticeable effect there may be as few as two reacted repeating units per polymer molecule, advantageously at least four and in large polymer molecules there are preferably at least two for each 100 repeating units in the polymer.

Also for the purpose of this invention a hydroxy-substituted polymer which has been pretreated with NaOH to form the —ONa derivative of the hydroxy group as in Example XIII are considered as the equivalent of the hydroxy-substituted polymer.

EXAMPLE XIV a. Cellulose triacetate is partially hydrolyzed to give one hydroxy and two acetate groups per cellulose repeating unit. This is dissolved in dimethylsulfoxide to give 28.6 parts of cellulose derivative in 100 parts of DMSO. This solution is added slowly to a solution at 20-30°C. containing 100 parts DMSO, 33.7 parts of ClP(O)(OCH$_2$CCl=CHCl)$_2$ and 5.9 parts of trimethylamine. Stirring and reaction are continued for 3 hours. Then, after filtration, the solution is poured into a large volume of water to precipitate the polymer product. The product is filtered and the byproduct amine hydrochloride remains in the water. After drying, the polymer product is analyzed for P and Cl and the analyses confirm the repeating unit structure of

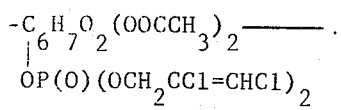

The above procedure is repeated a number of times using equivalent amounts of other XP(O)(ORCX=CXR')$_2$ compounds to give polymers having the following specific repeating units fitting the general repeating unit formula

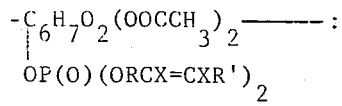

(b)  -C$_6$H$_7$O$_2$(OOCCH$_3$)$_2$
     |
     OP(O)(OCH$_2$CBr=CHBr)$_2$ (c)  -C$_6$H$_7$O$_2$(OOCCH$_3$)$_2$
     |
     OP(O)[O(CH$_2$)$_4$CCl=CClCH$_3$]$_2$ (d)  -C$_6$H$_7$O$_2$(OOCCH$_3$)$_2$
     |
     OP(O)(OCH$_2$C$_6$H$_{10}$CH$_2$CBr=CHBr)$_2$ (e)  -C$_6$H$_7$O$_2$(OOCCH$_3$)$_2$
     |
     OP(O)(OC$_6$H$_3$(CH$_3$)CCl=CClC$_6$H$_5$)$_2$ (f)  -C$_6$H$_7$O$_2$(OOCCH$_3$)$_2$
     |
     OP(O)(OCH$_2$CBr=CBr$_2$)$_2$

EXAMPLE XV

The procedure of Example XIV is repeated using a methyl cellulose having an average of 1.5 methoxy groups per repeating unit. This means that about half of the repeating units have two methoxy groups and one available hydroxy group per repeating unit and the other half have one methoxy group and two available hydroxy groups per repeating unit. Equivalent amounts of the respective reagents are used as in Example XIV and analyses of the polymer product confirms that the polymer product has repeating unit structures of the formulas:

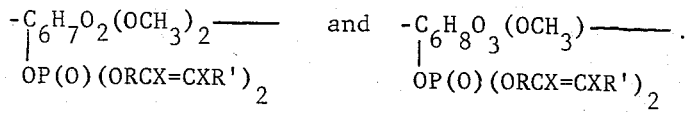

The specific repeating units have the above phosphorushalogen portions of the two above formulas replaced by:

(b)  OP(O)(OCH$_2$CBr=CHBr)$_2$ (c)  OP(O)[O(CH$_2$)$_5$CCl=CClC$_2$H$_5$]$_2$ (d)  OP(O)(OCH$_2$C$_6$H$_4$CH$_2$CBr=CHBr)$_2$ (e)  OP(O)(OCH$_2$CBr=CBr$_2$)$_2$ (f)  OP(O)(OCH$_2$CCl=CHCl)$_2$

EXAMPLE XVI a. A linear phenol-formaldehyde polymer having an average molecular weight of about 1500 is dissolved in acetone to give a solution containing 10.6 parts of polymer in 100 parts of acetone. This is added slowly to a solution containing 100 parts of acetone, 53.4 parts of ClP(O)(OCH$_2$CBr=CHBr)$_2$ and 5.9 parts of trimethylamine. Stirring and reaction are continued at 20°–30° C. for three hours. At the end of this period, the reaction solution is filtered and the filtrate is added to a large volume of water (1000 parts or more). The polymer product is thereby precipitated and any remaining traces of amine hydrochloride are dissolved in the water. The product is separated, dried and analyzed for P and Br. The analyses correspond to the theoretical content for the repeating unit structure having the formula

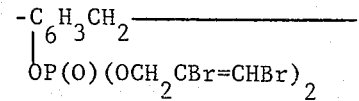

When a lower proportion of the phosphorus-halogen reagent is used the polymer also has the starting repeating units of the formula

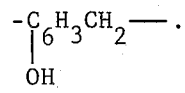

When the above procedure is repeated a number of times using equivalent amounts of other phosphorus-halogen compounds, other polymers are obtained having the following specific repeating units fitting the general repeating unit formula

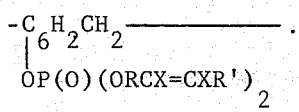

The specific formulas are:

(b)  —C₆H₃CH₂—
     |
     OP(O)(OCH₂CCl=CHCl)₂

(c)  —C₆H₃CH₂—
     |
     OP(O)(OCH₂CH₂CCl=CHCl₂)

(d)  —C₆H₃CH₂—
     |
     OP(O)(OCH₂CCl=CCl₂)₂

(e)  —C₆H₃CH₂—
     |
     OP(O)(OCH₂CBr=CBr₂)₂

(f)  —C₆H₃CH₂—
     |
     OP(O)(OC₆H₄CCl=CClCH₃)₂

When less than the equivalent amount of phosphorus-halogen reagent is reacted, the above polymers also have a corresponding number of the starting repeating units. Also, when the above polymer products are flame tested, they also show self-extinguishing products. The selfextinguishing properties are also evident when these polymers are each blended in 10% proportion with phenolformaldehyde resin.

EXAMPLE XVII

The procedure of Example XVI is repeated a number of times using equivalent amounts respectively of other phenolic-aldehyde resins derived from phenols having the general formula Y—C₆H₄OH and aldehydes having the general formula R'''CHO. These give repeating unit structures of the general formula

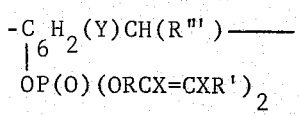

wherein Y represents X, R''', OR''' or CH(R''')OH, and R''' represents hydrogen or a monovalent hydrocarbon radical of 1–20 carbon atoms. Polymers of this type are prepared having the following specific repeating unit formulas:

(a)  —C₆H₂(CH₃)CH₂—
     |
     OP(O)(OCH₂CCl=CHCl)₂

(b)  —C₆H₂(C₂H₅)CH(CH₃)—
     |
     OP(O)(OCH₂CCl=CHCl)₂

(c)  —C₆H₂(Cl)CH(C₃H₇)—
     |
     OP(O)(OCH₂CCl=CHCl)₂

(d)  —C₆H₂(C₆H₅)CH(C₆H₅)—
     |
     OP(O)(OCH₂CCl=CHCl)₂

(e)  —C₆H₃CH(C₆H₁₁)—
     |
     OP(O)(OCH₂CCl=CHCl)₂

(f)  —C₆H₂(OCH₃)CH₂—
     |
     OP(O)(OCH₂CCl=CHCl)₂

(g)  —C₆H₂(OC₆H₅)CH₂—
     |
     OP(O)(OCH₂CCl=CHCl)₂

-Continued (h)  —C₆H₂(CH₂OH)CH₂—
     |
     OP(O)(OCH₂CCl=CHCl)₂
     and/or

—C₆H₂(OH)CH₂—
     |
     CH₂OP(O)(OCH₂CCl=CHCl)₂
     CH₃

(i)  —C₆H₂(CHOH)CH(CH₃)—
     |
     OP(O)(OCH₂CCl=CHCl)₂
     and/or

—C₆H₂(OH)CH(CH₃)—
     |
     CH(CH₃)OP(O)(OCH₂CCl=CHCl)₂

C₆H₅
         |
(j)  —C₆H₂(CHOH)CH(C₆H₅)—
     |
     OP(O)(OCH₂CCl=CHCl)₂
     and/or —C₆H₂(OH)CH(C₆H₅)—
     |
     CH(C₆H₅)OP(O)(OCH₂CCl=CHCl)₂

EXAMPLE XVIII a. A polymer is prepared by known esterification procedures from glycerine and phthalic anhydride (or from the commercially available glycidol monoester of phthalic acid:

$$CH_2-CHCH_2OOCC_6H_4COOH).$$
$$|\quad\quad|$$
$$OH\quad OH$$

This polymer has an average molecular weight of about 15,000 and has a repeating unit structure of

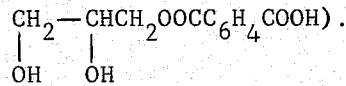

A solution is prepared using 22 parts of the above polymer in 100 parts of dimethylacetamide (DMAC). This solution is added gradually to a solution at 20°–30° C. containing 100 parts of DMAC, 33.7 parts of ClP(O)-(OCH₂CCl=CHCl)₂ and 5.9 parts of trimethylamine. Stirring and reaction are continued for 3 hours. The reaction solution is filtered to remove precipitated aminehydrochloride and the filtrate is poured into a large volume of water. The reacted polymer is thereby precipitated with remaining traces of aminehydrochloride being dissolved in the water. The polymer is filtered and dried. Analyses for P and Cl corroborate the repeating unit structure:

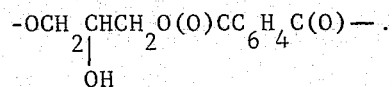

When flame tested, this polymer is found to be self-extinguishing. This self-extinguishing property is evident when 10% of this polymer is blended with various polyester resins including poly(glycol-phthalate), poly(glycol-maleate), poly(divinylphthalate), poly(-butyleneglycol phthalate), and poly(propyleneglycol-maleate-phthalate).

b. The procedure of paragraph (a) is repeated using a polyester prepared from phthalic anhydride and an equimolar mixture of ethylene glycol and glycerine to give a repeating unit structure of the formula:

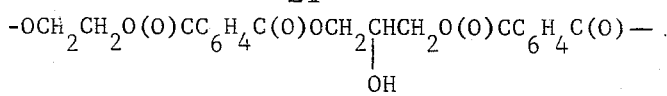

The resultant repeating unit structure is

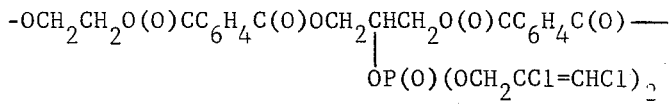

The repetition of the procedure of paragraph (a) individually with a number of other phosphorus-halogen compounds using equivalent amounts respectively produces polymers having similar self-extinguishing properties and having the following specific repeating unit formulas:

(c)    —OCH$_2$CHCH$_2$O(O)CC$_6$H$_4$C(O)——
               |
               OP(O)(OCH$_2$CBr=CHBr)$_2$ (d)    —OCH$_2$CHCH$_2$O(O)CC$_6$H$_4$C(O)——
               |
               OP(O)(OCH$_2$CCl=CCl$_2$)$_2$ (e)    —OCH$_2$CHCH$_2$——————
            |
            OP(O)(OCH$_2$CH$_2$CBr=CBrCH$_3$)$_2$ (f)    —OCH$_2$CHCH$_2$——————
           |
            OP(O)(OC$_6$H$_4$CH(CH$_3$)CCl=CHCl)$_2$

The repetition of the procedure of paragraph (a) is effected a number of times using a number of other hydroxy-containing polyester resins and using equivalent amounts thereof produces polymers having similar selfextinguishing properties and having the following specific repeating unit structures:

(g)    —OCH$_2$CCH$_2$O(O)CCH=CHC(O)——
           |
           CH$_2$OH
           OP(O)(OCH$_2$CCl=CHCl)$_2$ (h)    —OCH$_2$CCH$_2$O(O)CCH$_2$CH$_2$C(O)——
           |
           C$_2$H$_5$
           CH$_2$OP(O)(OCH$_2$CCl=CHCl)$_2$ (i)    —OCH$_2$C$_6$H$_3$CH$_2$O(O)CC$_6$H$_4$C(O)——
           |
           CH$_2$OP(O)(OCH$_2$CCl=CHCl)$_2$ (j)    —OCH$_2$CHCH$_2$O(O)C(CH=CH$_2$)CH$_2$C(O)——
          |
           OP(O)(OCH$_2$CCl=CHCl)$_2$

When the above procedures are repeated with reaction of less than an equivalent amount of the phosphorus-halogen reagent, the resultant polymers also contain repeating units of the starting polymer.

EXAMPLE XIX

Twenty parts of the polymer prepared in Example X(a) having the repeating unit formula

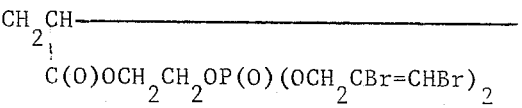

is mixed with 100 parts respectively of polystyrene, polymethyl methacrylate, polyacrylonitrile, polybutadiene, polyvinylacetate and molded in each case to a hard casting. In each case attempts to ignite each casting shows the product to be self-extinguishing. The procedure is repeated a number of times with similar results using the polymers prepared in Examples XI–XVIII. It is found that as little as 0.1 percent by weight of homopolymers of this invention show fire-retardant effects when blended with other compositions although at least 0.5 percent is preferred. When copolymers are used having the phosphorus-halogen repeating units, the proportions of such repeating units should represent at least 0.1 percent and preferably at least 0.5 percent of the total composition.

As indicated above, somewhat similar polymers may be produced by the reaction of a 1,2-oxirane compound with a mono- or di-hydroxy phosphorus compound containing two or one —ORCX=CXR′ groups. When the oxirane compound has a plurality of oxirane groups and two or more molecules of the phosphorus-halogen compound are reacted therewith, there will be two or more of the phosphorus-halogen repeating units in the products. Such products differ, however, from the compositions described above in that the repeating unit also contains a hydroxy group attached to a carbon adjacent to the carbon to which the phosphorushalogen group is attached.

This reaction is illustrated as follows:

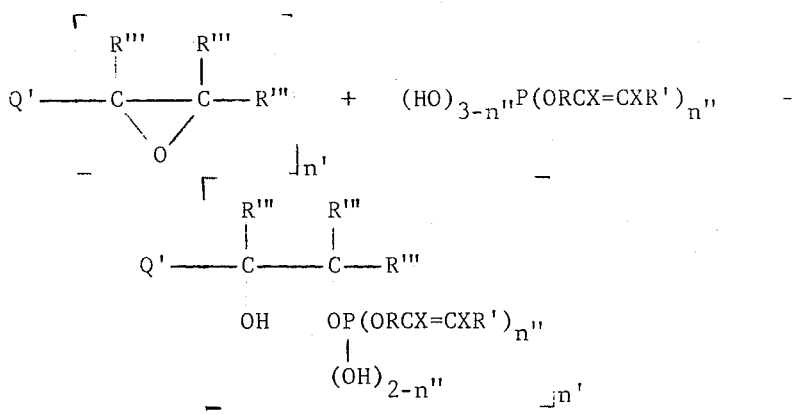

wherein:
  Q′ is an organic moiety representing the residue or nucleus of the compound containing the oxirane radicals;
  n′ has a value of at least one;
  n″ has a value of one or two;
  R′″ represents hydrogen or R′, preferably at least two R''' groups are hydrogen; and the other symbols have the same definitions as given above.

When n' is one, the reaction product is a monomeric compound. When n' is two or more, the product is a polymer with the polymer backbone represented as Q'.

When n'' is one, there are two hydroxy groups attached to the phosphorus and it is possible to have one or both of these reacted with oxirane groups. If two hydroxys react with oxirane groups, there may be a crosslink created between two Q' moieties or polymer backbones or there is a cyclic structure created within the same molecule.

Typical oxirane compounds in which n' is one include styrene oxide, ethylene oxide, propylene oxide, butylene oxide, hexylene oxide, butadiene monooxide, divinylbenzene monooxide, decylene oxide, vinylnaphthalene oxide, vinyltoluene oxide, cyclohexenyl oxide, vinylcyclohexane oxide, vinyl cycloheptane oxide, glycidol, epichlorohydrin, phenoxyethylene oxide, phenyl glycidyl ether, tolyl glycidyl ether, naphthyl glycidyl ether, ethyl glycidyl ether, butyl glycidyl ether, dodecyl glycidyl ether, 1-phenoxy-2,3-butylene oxide, glycidyl acrylate, glycidyl acetate, glycidyl butyrate, glycidyl benzoate, monoglycidyl maleate, monoglycidyl phthalate, glycidyl methacrylate, glycidyl chloracrylate, ethyl butenoate oxide, diethyl maleate oxide and the like.

Thus monovalent Q' radicals may be phenyl, hydrogen, methyl, ethyl, butyl, ethenyl, vinylphenyl, octyl, naphthyl, tolyl, tetramethylene, cyclohexyl, phenoxymethyl, tolyloxymethyl, naphthyloxymethyl, cycloheptyl, hydroxymethyl, chloromethyl, phenoxy, ethoxymethyl, butoxymethane, dodecyloxymethyl, phenoxymethyl, acryloxymethyl, acetoxymethyl, butyroxymethyl, benzoxymethyl, maleoxymethyl, carboxybenzoxymethyl, methacryloxymethyl, chloracryloxymethyl, and the like.

Typical oxirane compounds in which n' is two include butadiene dioxide, hexadiene dioxide, dodecadiene dioxide, diglycidyl benzene, dibutenylbenzene dioxide, diglycidyl cyclohexane, divinylbenzene dioxide, divinylcyclohexane dioxide, divinylcycloheptane dioxide, diglycidyl ether of resorcinol, diglycidyl ether of hydroquinone, diglycidyl ether of bisphenol, diglycidyl ether, diglycidyl ether of ethylene glycol, diglycidyl ether of butylene glycol, diglycidyl ether of HO(CH$_2$CH$_2$O)$_n$· CH$_2$CH$_2$OH where n' is at least one, diglycidyl ether of cyclohexanediol, diglycidyl ether of dimethylol cycloheptane, the dioxide of the dibutenyl ether of ethylene glycol, the dioxide of vinyl acrylate, the dioxide of allyl acrylate, the dioxide of divinyl succinate, the dioxide of divinyl phthalate, diglycidyl succinate, diglycidyl maleate, diglycidyl fumarate, diglycidyl itaconate, diglycidyl phthalate, diglycidyl sulfide, and the like.

Thus divalent Q' radicals may be methylene, ethylidene, propylidene, hexylidene, phenylene, diethylenephenylene, dimethylenecyclohexylene, cyclohexylene, cycloheptylene, —CH$_2$OC$_6$H$_6$OCH$_2$—, —CH$_2$OC$_6$H$_4$C(CH$_3$)$_2$C$_6$H$_4$OCH$_2$—, —CH$_2$OCH$_2$—, —CH$_2$OCH$_2$CH$_2$OCH$_2$—, —CH$_2$O(CH$_2$)$_4$OCH$_2$—, —CH$_2$O(CH$_2$CH$_2$O)CH$_2$CH$_2$OCH$_2$—, —CH$_2$OC$_6$H$_{10}$OCH$_2$—, —CH$_2$OC$_5$H$_8$OCH$_2$—, —CH$_2$CH$_2$OCH$_2$CH$_2$OCH$_2$CH$_2$—, —OC(O)—, —CH$_2$OC(O)—, —OC(O)CH$_2$CH$_2$C(O)O—, —OC(O)C$_6$H$_4$C(O)O—, —CH$_2$OC(O)CH$_2$CH$_2$C(O)OCH$_2$—, —CH$_2$OC(O)CH=CH-C(O)OCH$_2$—, —CH$_2$OC(O)CH(CH=CH$_2$)CH$_2$C(O)OCH$_2$—, —CH$_2$OC(O)C$_6$H$_4$C(O)OCH$_2$O—, —CH$_2$SCH$_2$—, —CH$_2$S(O)CH$_2$—, etc.

Typical oxirane compounds having two or more 1,2-oxirane groups include:

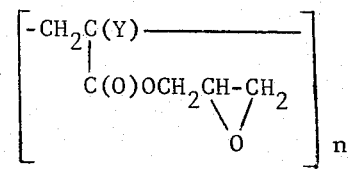

wherein Y is H, CH$_3$ or Cl;

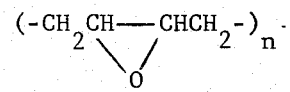

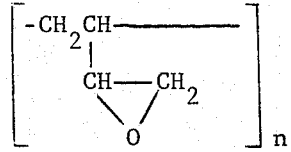

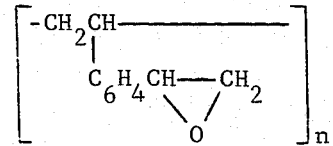

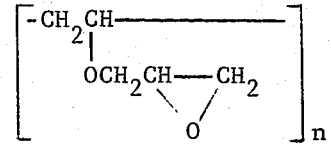

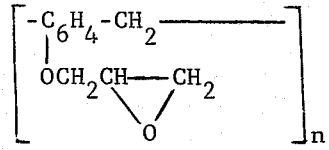

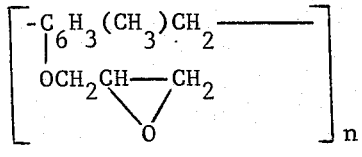

Various other polyepoxides are disclosed in U.S. Pat. Nos. 3,676,397; 3,676,398 and 3,673,128. The polyepoxides disclosed in these patents are incorporated herein by reference thereto.

When the phosphorus-halogen compound is HOP(ORCX=CXR')$_2$, the products produced by the process of this reaction have the formula:

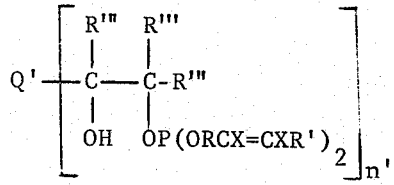

When the phosphorus-halogen compound is (HO)$_2$PORCX=CXR', the products produced have the formula:

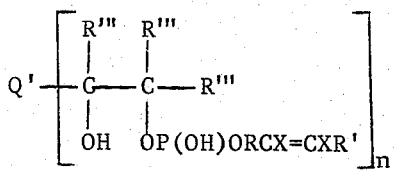

In the product formulas shown above, the phosphorus-halogen group is shown attached to the carbon atom of the original oxirane radical farthest from the Q' group. When both R''' groups attached to that carbon are hydrogen, steric hindrance favors this position. However, when either or each of these groups is a sizeable hydrocarbon, the phosphorus-halogen radical may become attached to either one of oxirane carbon atoms and in such case the product may actually be a mixture in which both types of derivatives are present. However, for sake of convenience, the formulas show the positioning on the terminal carbon atom although it is recognized that the positioning may vary somewhat as discussed above.

The reaction between the oxirane and the hydroxyphosphorus compound proceeds at 0°–100° C., advantageously 40°–70° C. An inert solvent such as listed above may be used particularly where one or both of the reagents may be solid or viscous and also for dissipation of the heat of reaction. Since no byproducts are formed, the products may be used directly when reaction is completed between molar equivalents of reagents. Substantial reaction is effected within 10–20 minutes, and the reaction is generally completed within 1–5 hours. If desired, any solvent used may be removed by vaporization.

If desired, the free hydroxy group may be reacted with an acyl halide group to produce esters or with other reagents to produce other derivative groups.

EXAMPLE XX

To each of a number of samples of 28.4 parts of HO-P+OCH$_2$CCl=CHCl)$_2$ respectively there is added slowly with stirring the indicated amount of individual epoxy compounds and in each case the mixture is allowed to react at 50°–60° C. and stirring continued for 1 hour after the addition is completed. There are obtained the following derivatives respectively:

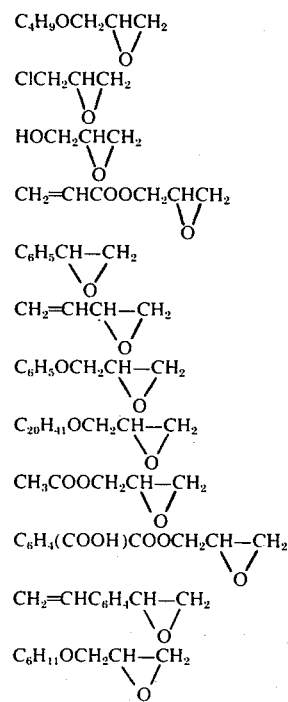

The analyses for P and Cl in each case corresponds closely to the theoretical values. Each of these products when flametested showed self-extinguishing properties.

EXAMPLE XXI

Each of the procedures of Example XX is repeated a number of times using equivalent amounts respectively of a variety of hydroxy-phosphorus-halogen reagents to give corresponding products in which the phosphorushalogen portion in each case varies according to the reagent used, which reagents and derivative groups are indicated as follows.

(a) HOP(OCH$_2$CBr=CHBr)$_2$ → —OP-(OCH$_2$CBr=CHBr)$_2$ (b) HOP(OCH$_2$CCl=CCl$_2$)$_2$ → —OP-(OCH$_2$CCl=CCl$_2$)$_2$ (c) HOP(OCH$_2$CBr=CBr$_2$)$_2$ → —OP-(OCH$_2$CBr=CBr$_2$)$_2$ (d) HOP[O(CH$_2$)$_4$CCl=CHCl]$_2$ → —OP-[O(CH$_2$)$_4$CCl=CHCl]$_2$ (e) HOP(OC$_6$H$_4$CBr=CHBr)$_2$ → —OP-(OC$_6$H$_4$CBr=CHBr)$_2$ (f) HOP(OCH$_2$C$_6$H$_4$CCl=CHCl)$_2$ → OP-(OCH$_2$C$_6$H$_4$CCl=CHCl)$_2$ (g) HOP(OCH$_2$C$_6$H$_4$CH$_2$CBr=CHBr)$_2$ → —OP-(OCH$_2$C$_6$H$_4$CH$_2$CBr=CHBr)$_2$ (h) HOP(OC$_6$H$_{10}$CCl=CHCl)$_2$ → —OP-(OC$_6$H$_{10}$CCl=CHCl)$_2$ (i) HOP(OCH$_2$C$_6$H$_{10}$CH$_2$CBr=CHBr)$_2$ → —OP-(OCH$_2$C$_6$H$_{10}$CH$_2$CBr=CHBr)$_2$ (j) HOP[OC$_6$H$_3$(CH$_3$CHCl]$_2$ → —OP-[OC$_6$H$_3$(CH$_3$)CCl=CHCl]$_2$ (k) HOP(OCH$_2$CCl=CClCH$_3$)$_2$ → —OP-(OCH$_2$CCl=CClCH$_3$)$_2$ (l) HOP(OCH$_2$CBr=CBrCH$_2$CH$_3$)$_2$ → —OP-(OCH$_2$CBr=CBrCH$_2$CH$_3$)$_2$ (m) HOP(OCH$_2$CCl=CClC$_6$H$_5$)$_2$ → —OP-(OCH$_2$CCl=CClC$_6$H$_5$)$_2$ (n) HOP(OCH$_2$CL=CClC$_6$H$_{11}$)$_2$ → —OP-(OCH$_2$CCl=CClC$_6$H$_{11}$)$_2$ (o) HOP(OCH$_2$Cl=CClCH$_2$C$_6$H$_5$)$_2$ → —OP-(OCH$_2$CCl=CClCH$_2$C$_6$H$_5$)$_2$ (p) HOP[OCH$_2$CCl=CClCH(CH$_3$)$_2$]$_2$ → —OP-[OCH$_2$CCl=CClCH(CH$_3$)$_2$]$_2$

EXAMPLE XXII

Each of the procedures of Example XX is repeated a number of times using equivalent amounts respectively of a variety of dihydroxy-phosphorus-halogen reagents and the corresponding products are obtained in which the phosphorus-halogen derivative groups are as follows:

(a) —OP(OH)OCH$_2$CCl=CHCl
(b) —OP(OH)OCH$_2$CBr=CHBr
(c) —OP(OH)OCH$_2$CCl=CCl$_2$
(d) —OP(OH)OCH$_2$CBr=CBr$_2$
(e) —OP(OH)O(CH$_2$)$_4$CCl=CHCl
(f) —OP(OH)OC$_6$H$_4$CBr=CHBr
(g) —OP(OH)OCH$_2$C$_6$H$_4$CCl=CHCl
(h) —OP(OH)OCH$_2$C$_6$H$_4$CH$_2$CBr=CHBr
(i) —OP(OH)OC$_6$H$_{10}$CCl=CHCl
(j) —OP(OH)OCH$_2$C$_6$H$_{10}$CH$_2$CBr=CHBr
(k) —OP(OH)OC$_6$H$_3$(CH$_3$)CCl=CHCl
(l) —OP(OH)OCH$_2$CCl=CClCH$_3$
(m) —OP(OH)OCH$_2$CBr=CBrCH$_2$CH$_3$
(n) —OP(OH)OCH$_2$CCl=CClC$_6$H$_5$
(o) —OP(OH)OCH$_2$CCl=CClC$_6$H$_{11}$
(p) —OP(OH)OCH$_2$CCl=CClCH$_2$C$_6$H$_5$
(q) —OP(OH)OCH$_2$CCl=CClCH(CH$_3$)$_2$

EXAMPLE XXIII

The procedure of Example XX is repeated a number of times using various diepoxy compounds as indicated below and in each case using a 1/2 molar portion per molar portion of the hydroxy-phosphorus-halogen compound. There are obtained the following derivatives respectively:

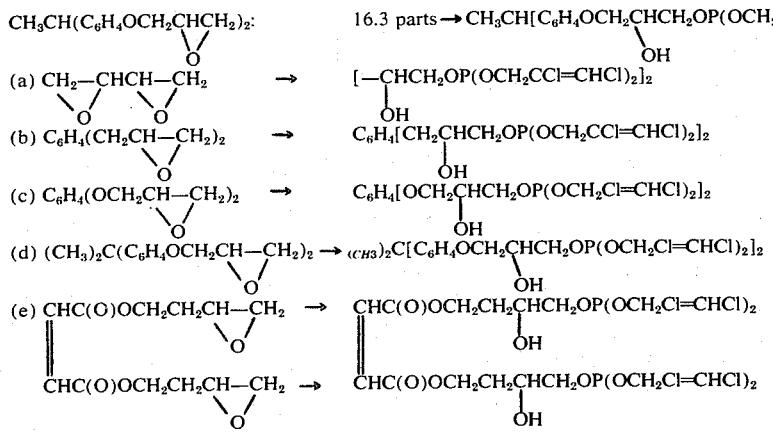

The above reactions are repeated a number of times using equivalent amounts of various other hydroxy-phosphorus-halogen compounds and in each case the corresponding derivatives are obtained in which the phosphorus-halogen derivative groups of the above compounds are replaced by the following:

(f) —OP(OCH$_2$CBr=CHBr)$_2$
(g) —OP(OCH$_2$CCl=CCl$_2$)$_2$
(h) —OP(OCH$_2$CBr=CBr$_2$)$_2$
(i) —OP[O(CH$_2$)$_4$CCl=CHCl]$_2$
(j) —OP(OCH$_2$C$_6$H$_4$CCl=CHCl)$_2$
(k) —OP(OCH$_2$CCl=CClCH$_3$)$_2$
(l) —OP(OH)OCH$_2$CCl=CHCl$_2$
(m) —OP(OH)OCH$_2$CBr=CHBr
(n) —OP(OH)OCH$_2$CCl=CCl$_2$
(o) —OP(OH)OCH$_2$CBr=CBr$_2$
(p) —OP(OH)O(CH$_2$)$_4$CCl=CHCl
(q) —OP(OH)OCH$_2$C$_6$H$_4$CBr=CHBr

EXAMPLE XXIV a. A solution of 12.8 parts of a homopolymer of glycidyl acrylate having a molecular weight of about 2000 in 100 parts of dimethylsulfoxide is added gradually with stirring and under a nitrogen atmosphere to a solution maintained at 50°–60° C. and containing 28.4 parts of HOP(OCH$_2$CCl=CHCl)$_2$ and 100 parts of dimethylsulfoxide. Stirring is continued for 1 hour after addition is completed. The resultant solution is dumped into 1000 parts of water and the precipitated polymer is separated and dried. Qualitative tests on the product show the absence of the oxirane group and the presence of the hydroxy group, and analyses for P and Cl correspond closely to the theoretical values for the polymer having the repeating unit structure

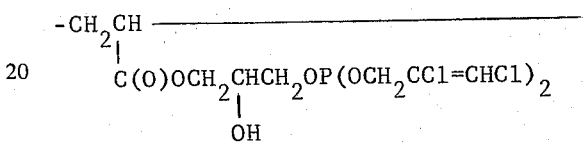

The above procedure is repeated a number of times with equivalent amounts of various other phosphorus-halogen compounds to produce polymers having the following repeating unit structures respectively:

(b) —CH$_2$CH
         |
         C(O)OCH$_2$CH(OH)CH$_2$OP(OCH$_2$CBr=CHBr)$_2$ (c) —CH$_2$CH
         |
         C(O)OCH$_2$CH(OH)CH$_2$OP(OCH$_2$CCl=CCl$_2$)$_2$ (d) —CH$_2$CH
         |
         C(O)OCH$_2$CH(OH)CH$_2$OP(OCH$_2$CBr=CBr$_2$)$_2$ (e) —CH$_2$CH
         |
         C(O)OCH$_2$CH(OH)CH$_2$OP(OCH$_2$CCl=CClCH$_3$)$_2$ (f) —CH$_2$CH
         |
         C(O)OCH$_2$CH(OH)CH$_2$OP[O(CH$_2$)$_4$CCl=CHCl]$_2$ (g) —CH$_2$CH
         |
         C(O)OCH$_2$CH(OH)CH$_2$OP(OCH$_2$C$_6$H$_4$CCl=CHCl)$_2$ (h) —CH$_2$CH
         |
         C(O)OCH$_2$CH(OH)CH$_2$OP(OCH$_2$CCl=CClC$_6$H$_{11}$)$_2$ (i) —CH$_2$CH
         |
         C(O)OCH$_2$CH(OH)CH$_2$OP(OH)OCH$_2$CCl=CHCl

29
-Continued (j)  —CH₂CH
    |
    C(O)OCH₂CH(OH)CH₂OP(OH)OCH₂CBr=CHBr (k)  —CH₂CH
    |
    C(O)OCH₂CH(OH)CH₂OP(OH)OCH₂CCl=CCl₂

(l)  —CH₂CH
    |
    C(O)OCH₂CH(OH)CH₂OP(OH)OCH₂CBr=CBr₂

(m)  —CH₂CH
    |
    C(O)OCH₂CH(OH)CH₂OP(OH)O(CH₂)₄CCl=CHCl (n)  —CH₂CH
    |
    C(O)OCH₂CH(OH)CH₂OP(OH)OCH₂CCl=CClCH₃

(o)  —CH₂CH
    |
    C(O)OCH₂CH(OH)CH₂OP(OH)OCH₂C₆H₄CCl=CHCl

EXAMPLE XXV

The procedure of Example XXIV(a) is repeated a number of times using in place of the polymer of that example equivalent amounts respectively of various other oxirane polymers to produce polymers having the following repeating unit structures respectively:

(a)  —CH₂C(CH₃)
    |
    C(O)OCH₂CH₂CH(OH)CH₂OP(OCH₂CCl=CHCl)₂

(b)  —CH₂CH
    |
    CH(OH)CH₂OP(OCH₂CCl=CHCl)₂

(c)  —CH₂CH
    |
    C₆H₄CH(OH)CH₂OP(OCH₂CCl=CHCl)₂

(d)  —CH₂CH
    |
    OCH₂CH(OH)CH₂OP(OCH₂CCl=CHCl)₂

(e)  —C₆H₄CH₂—
    |
    OCH₂CH(OH)CH₂OP(OCH₂CCl=CHCl)₂

Also related to the compositions of this invention are compositions prepared by the reaction of HOP-(ORCX=CXR')₂ with an aldehyde and an organic nitrogen compound having one or two hydrogen atoms on a nitrogen of such compound as shown by the following reaction:

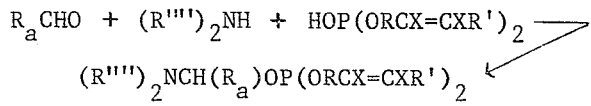

in which $R_a$ represents hydrogen or a hydrocarbon group, or a hydrocarbon group substituted with one or more additional —CHO radicals; R'''' represents hydrogen or a hydrocarbon group of 1–20 carbon atoms with no more than one R'''' group representing hydrogen, or a group containing hydrocarbon portions and additional amine groups, or a R''C(O)— radical, or a hydrocarbon group of 1–20 carbon atoms substituted with amine groups or a hydroxy group; and R, R' and X are as defined above.

The group defined as $R_a$ may be aliphatic saturated or unsaturated, cycloaliphatic, aromatic, heterocyclic and may have attached thereto as many as 100 CHO groups, such as in a high polymer of acrolein. Typical aldehydes include formaldehyde, acetaldehyde, propionaldehyde, butyraldehyde, acrolein, benzaldehyde, furfuraldehyde, cyclohexylaldehyde, crotonaldehyde, glyoxal, benzaldehyde, terephthaldehyde, and the like.

The group defined as R'''' may be aliphatic, saturated or unsaturated, cycloaliphatic, aromatic, heterocyclic, etc., and may have one or more such nitrogen atoms in the molecule. Typical amines that are suitable include, methylamine, dimethylamine, propylamine, dibutylamine, aniline, N-methylaniline, cyclohexylamine, allylamine, methylallylamine, N-allylaniline, hydroxyalkylamines, such as monoethanol amine, diethanol amine, isopropanol amine, diisopropanol amine, n-propanol amine, di-n-propanol amine, butanol amines, hexanol amines, etc.; polyamines, such as ethylenediamine, methyl ethylenediamine, dimethyl ethylenediamine, trimethyl ethylenediamine, propylenediamine, methyl propylenediamine, dimethyl propylenediamine, diethyl propylenediamine, tetramethylene diamine, hexamethylene diamine, diethylene triamine, tetraethylene penta-amine, etc.; polyimines, such as polyethyleneimine, polypropyleneimine, polybutyleneimine, etc., (The number of nitrogen atoms in such polyamines and polyimines have no upper limit, but from a practical standpoint no particular advantage is gained in having more than 50 nitrogen atoms in such compounds.); further substituted derivatives of such hydroxy and amine derivatives such as carboxy, ether and amide derivatives, e.g. acetoxyethyl amine, bis(acetoxyethyl)amine, acetoxypropyl amine, benzoxyethyl amine, beta-aminoethoxyethyl acetate, beta-aminoethyl acrylate, beta-aminopropoxyethyl acrylate, ethyl(3-aminocaproate), methyl(4-aminohexoate), allyl(4-aminohexoate), propargyl(5-aminooctoate), etc., ethoxyethylamine, bis(ethoxyethyl)amine, propoxypropylamine, phenoxybutylamine, cyclohexoxyethylamine, etc., acetamidoethyl amine, propanoamidoethyl amine, butyroamidopropyl amine, benzoamidoethyl amine, bis(acetamidoethyl)amine, etc.; addition polymers of amines having polymerizable ethylenic groups attached thereto such as polyacrylates having amino-substituted ester and amide groups, i.e. poly(beta-aminoethylacrylate), poly(beta-aminoethylacrylamide), poly(beta-aminopropyl methacrylate), poly(para-aminophenyl acrylate), poly(para-aminophenyl acrylamide), poly(para-aminobenzyl acrylamide), etc., polyallylamine, polymeric vinyl-beta-aminoethyl ether, polymeric p-amino-styrene, polymeric(beta-aminoethyl)-styrene, polymeric (aminoethyl)-styrene, etc.; hydrazines, such as hydrazine, phenyl hydrazine, diphenyl hydrazine, ethyl hydrazine, butyl hydrazine, etc.; semicarbazides, such as phenyl semicarbazide, diphenyl semicarbazide, methyl semicarbazide, etc.; cyclic amines, such as piperidine, 4-methyl piperidine, 2-ethyl piperidine, morpholine, etc.; heterocyclic amines, such as aminopyridine, methylaminopyridine, etc.

Typical amides that may be used as the nitrogen-containing compound include acetamide, propionamide, acrylamide, methacrylamide, diacetone acrylamide, maleic diamide, fumaric diamide, itaconic diamide, half ester amides, such as methyl, ethyl, allyl, etc., half ester amides of fumaric, maleic, itaconic acids, etc., N, N-diallyl urea, benzamide, lactamide, and the like. Other suitable amides are listed in the Aldrich Catalogue and the list is incorporated herein by reference. With amides, they may be reacted simultaneously with the phosphorus-halogen or may be prereacted with the aldehyde to form an alkanolamide prior to the addition of the HOP(ORCX=CXR')$_2$.

The reaction may be conducted at 0°–100° C., preferably 40°–100° C. and may be conducted with or without solvent. An inert solvent is advantageous for dissipation of heat.

EXAMPLE XXVI

To respective mixtures of 40.8 parts of HOP(OCH$_2$CCl=CHCl)$_2$, 6.0 parts of paraformaldehyde, (CH$_2$O)$_x$ and 50 parts of tetrahydrofuran, there are added slowly, with stirring, one equivalent respectively of the following compounds, and the mixture in each case is allowed to react at 40°–75° C., after which the

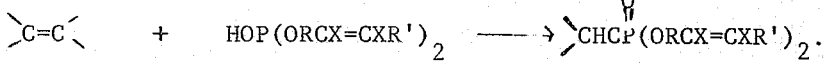

tetrahydrofuran is removed by distillation at 100 mm pressure. The following methyleneamino derivatives are obtained:

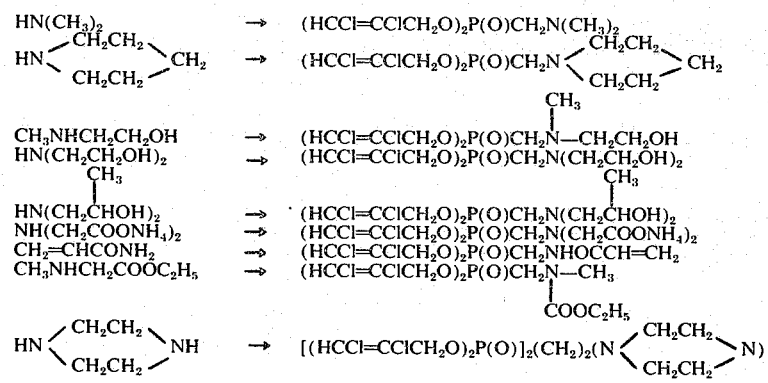

Other compositions also related to the compositions of this invention are those prepared by the reaction of HOP(ORCX=CXR')$_2$ with a compound containing an ethylenic group to produce compounds which are suitable for use as plasticizers or firerretardants, and for polymerization where there are other polymerizable groups remaining after the addition of the phosphorus-halogen compound. This addition reaction can be effected where there are no other groups in the ethylenic compound which are more reactive with the phosphorus-halogen reagent.

The reaction is advantageously conducted in the presence of a tertiary amine and may be conducted at a temperature of 0°–100° C., preferably 0°–50° C., and preferably under conditions which will not promote polymerization of the ethylenic compound.

Ethylenic compounds, or compounds containing >C=C< groups, which may be used in the practice of this invention include esters of alpha, beta-unsaturated esters, such as acrylates, maleates, fumarates, itaconates, alphamethylmaleates, and the like where the ester groups are hydrocarbon groups, preferably aliphatic groups, having 1–20, preferably 1–10 carbon atoms; vinyl esters of carboxylic mono and polybasic acids having 1–20 carbon atoms such as R''COOH, R(COOH)$_2$, etc., such as vinyl acetate, vinyl propionate, vinyl benzoate, divinylphthalate, vinylethylphthalate, allylmethylphthalate, diallylphthalate, divinylsuccinate, vinylpropylsuccinate, triallyl trimellitate, allyl-diethyl trimellitate, etc.; styrenes, such as styrene, vinyltoluene, vinylnaphthalene, divinylbenzene, etc.; alkenyl ethers, such as vinylethyl ether, divinylether, allylethylether, divinyl ether of ethylene glycol, diallyl ether of propylene glycol, etc.; polymers having unsaturation therein, such as polybutadienes (including 1,4-cis, 1,4-trans and 1,2-), linear polyallyl acrylates, etc.; polyacrylates of polyols, such as ethylenedimethacrylate, pentaerythritol tetraacrylate, glyceryl trimethacrylate, etc.; unsaturated phosphates, such as triallyl phosphate, triallyl phosphite, etc. Where there are more than one ethylenic group, the addition can be controlled by the molar amounts of phosphorus-halogen reagent used.

The products of this addition reaction may be represented as follows:

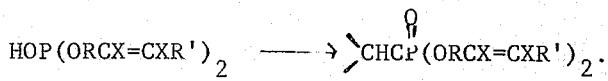

EXAMPLE XXVII

The compounds P(ORCX=CXR')$_3$ are reacted by using the procedure of Example IX but with a temperature of 75° C. (a) to give the HOP(ORCX=CXR')$_2$ by the similar reaction of 2 moles of P(ORCX=CXR')$_3$ with 1 mole of P(OH)$_3$; and (b) to give (HO)$_2$PORCX=CXR' by the similar reaction of one mole of P(ORCX=CXR')$_3$ with two moles of P(OH)$_3$.

EXAMPLE XXVIII a. To a stirred mixture of 30 parts of HOP(OCH$_2$CCl=CHCl)$_2$ and 14.4 parts of dimethyl maleate at 0°–5° C. is added 1 part of triethylamine and the mixture allowed to react for 4 hours. Then the temperature of the mixture is allowed to rise to 20° C. and is maintained at this point for 2 hours, following which it is heated at 35° C. for 3 hours and there is obtained 44 parts of

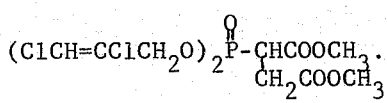

Substitution in the above procedure of equivalent amounts od diallyl fumarate, ethyl acrylate, divinyl benzene and ethylene glycol diacrylate for the dimethyl maleate yield the following compounds:

(b) $(ClHC=CClCH_2O)_2\overset{O}{\overset{\|}{P}}-\overset{|}{C}HCOOCH_2CH=CH_2$
$CH_2COOCH_2CH=CH_2$ (c) $(ClCH=CClCH_2O)_2\overset{O}{\overset{\|}{P}}-CH_2CH_2COOCH_2CH_3$ (d) $(ClCH=CClCH_2O)_2\overset{O}{\overset{\|}{P}}-CH_2CH_2C_6H_4CH=CH_2$ (e) $(ClCH=CClCH_2O)_2\overset{O}{\overset{\|}{P}}-CH_2CH_2C(O)OCH_2CH_2O(O)CCH=CH_2$ When the procedures of (a) through (f) are repeated a number of times using equivalent amounts respectively of $HOP(OCH_2CBr=CHBr)_2$; $HOP(OCH_2CH_2CCl=CHCl)_2$; $HOP(OCH_2CBr=CBr_2)_2$; $HOP(OCH_2CCl=CCl_2)_2$ and $HOP(OCH_2C_6H_4CCl=CHCl)_2$ the products have the following phosphorus-halogen groups in the respective products:

(g) $-P(O)(OCH_2CBr=CHBr)_2$
(h) $-P(O)(OCH_2CH_2CCl=CHCl)_2$
(i) $-P(O)(OCH_2CBr=CBr_2)_2$
(j) $-P(O)(OCH_2CCl=CCl_2)_2$
(k) $-P(O)(OCH_2C_6H_4CCl=CHCl)_2$

While certain features of this invention have been described in detail with respect to the various embodiments thereof, it will, of course, be apparent that other modifications may be made within the spirit and scope of this invention, an it is not intended to limit the invention to the exact details shown above except insofar as they are defined in the following claims:

The invention claimed is:

1. A polymeric ester having fire-retardant properties and having the formula $Q[OP(O)(ORCX=CXR')_2]_n$ wherein Q represents a polymeric organic moiety having a valency of n;

n represents an integer of at least 2;

R represents a divalent hydrocarbon radical having 1-20 carbon atoms; R' represents X, hydrogen or R'';

R'' represents a monovalent hydrocarbon radical containing 1-20 carbon atoms; and X represents chlorine or bromine;

said polymeric organic moiety being a hydroxy-containing polymer selected from the class consisting of (a) polymeric (hydroxyhydrocarbon) esters of acrylic, methacrylic and betachloroacrylic acids, (b) hydroxy-containing polystyrenes, (c) hydroxy-containing polymeric vinyl ethers, (d) polymeric alkanolamines, (e) linear phenolaldehyde polymers, (f) polymeric polyesters having unreacted hydroxy groups, (g) polyvinyl alcohols, partially etherified polyvinyl alcohols and partially esterified polyvinyl alcohols, and (h) cellulose, partially etherified cellulose and partially esterified cellulose.

2. The polymeric ester of claim 1 in which n has a value of at least 4.

3. The polymeric ester of claim 1 having the formula consisting essentially of a cellulosic structure having the formula $$(-\underset{|}{C_6H_9O_4} \text{———})_n.$$
$$OP(O)(ORCX=CXR')_2$$

4. The polymeric ester of claim 3 in which the polymeric ester also contains a plurality of cellulosic repeating units of formula $$-\underset{|}{C_6H_9O_4}-.$$
$$OH$$

5. The polymeric ester of claim 1 which comprises a plurality of celluloseacetate repeating units of the formula $$-\underset{|}{C_6H_7O_2}(OOCCH_3)_2 \text{———}.$$
$$OP(O)(ORCX=CXR')_2$$

6. The polymeric ester of claim 1 which comprises a plurality of celluloseacetate repeating units of a formula selected from the class consisting of $$-\underset{|}{C_6H_7O_2}(OCH_3)_2 \text{———}$$
$$OP(O)(ORCX=CXR')_2$$

and $$-\underset{|}{C_6H_8O_3}(OCH_3) \text{———}.$$
$$OP(O)(ORCX=CXR')_2$$

7. The polymeric ester of claim 1 which comprises a plurality of repeating units of the formula $$-CH_2\underset{|}{C}(Y) \text{———}.$$
$$C(O)OROP(O)(ORCX=CXR')_2$$

wherein Y is H, CH$_3$ or Cl.

8. The polymeric ester of claim 1 which comprises a plurality of repeating units of the formula $$-CH_2\underset{|}{CH} \text{———}.$$
$$C_6H_4OP(O)(ORCX=CXR')_2$$

9. The polymeric ester of claim 1 which comprises a plurality of repeating units of the formula $$-CH_2\underset{|}{CH} \text{———}.$$
$$OP(O)(ORCX=CXR')_2$$

10. The polymeric ester of claim 9 which also contains a plurality of repeating units of the formula $$-CH_2\underset{|}{CH}\text{———}.$$
$$OOCCH_3$$

11. The polymeric ester of claim 1 which comprises a plurality of repeating units of the formula $$-\underset{|}{C_6H_2}(Y)CH(R''') \text{———},$$
$$OP(O)(ORCX=CXR')_2$$

wherein Y is H, CH$_3$ or Cl.

12. The polymeric ester of claim 11 which comprises a plurality of repeating units of the formula

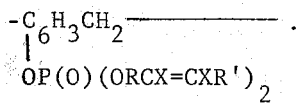

13. The polymeric ester of claim 12 which also comprises a plurality of repeating units of the formula

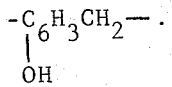

14. The polymeric ester of claim 1 in which the (ORCX=CXR')$_2$ represents (OCH$_2$CCl=CHCl)$_2$.

15. The polymeric ester of claim 1 in which the ORCX=CXR')$_2$ represents (OCH$_2$CBr=CHBr)$_2$.

16. The polymeric ester of claim 1 in which the (ORCX=CXR')$_2$ represents (OCH$_2$CCl=CCl$_2$)$_2$.

17. The polymeric ester of claim 1 in which the (ORCX=CXR')$_2$ represents (OCH$_2$CBr=CBr$_2$)$_2$.

18. The polymeric ester of claim 1 which comprises a plurality of cellulosic repeating units of the formula

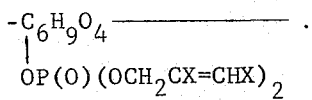

19. The polymeric ester of claim 18 which also contains a plurality of cellulosic repeating units of the formula

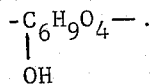

20. The polymeric ester of claim 1 which comprises a plurality of celluloseacetate repeating units of the formula

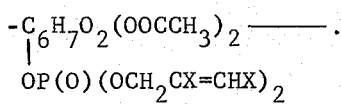

21. The polymeric ester of claim 1 which comprises a plurality of celluloseacetate repeating units of a formula selected from the class consisting of

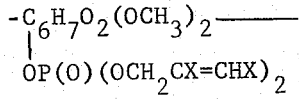

and

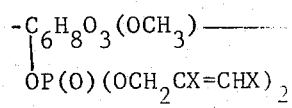

22. The polymeric ester of claim 1 which comprises a plurality of repeating units of the formula

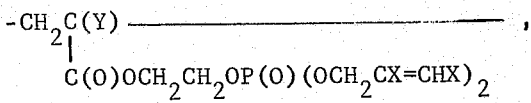

wherein Y is H, CH$_3$ or Cl.

23. The polymeric ester of claim 1 which comprises a plurality of repeating units of the formula

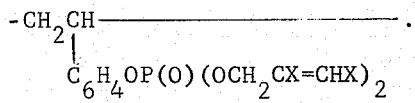

24. The polymeric ester of claim 1 which comprises a plurality of repeating units of the formula

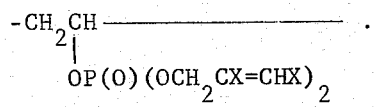

25. The polymeric ester of claim 24 which also contains a plurality of repeatig units of the formula

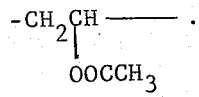

26. The polymeric ester of claim 1 which comprises a plurality of repeating units of the formula

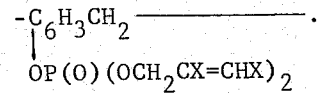

27. A process for preparing a polymeric ester of claim 1 comprising the steps of reacting at a temperature of 0°–100° C. a polymer having a plurality of hydroxy groups therein with a phosphorus-halogen compound of the formula XP(O)(ORCX=CXR')$_2$, and separating the polymeric product from the byproduct HX, wherein R, R' and X are as defined in claim 1.

28. The process of claim 27 which the reaction temperature is 50°–100° C.

29. The process of claim 27 in which a tertiary amine is used in the reaction mixture to react with the byproduct HX.

30. The process of claim 27 in which said tertiary amine is trimethyl amine.

* * * * *

UNITED STATES PATENT OFFICE
CERTIFICATE OF CORRECTION

PATENT NO. : 3,888,844
DATED : June 10, 1975
INVENTOR(S) : Gaetano F. D'Alelio

It is certified that error appears in the above-identified patent and that said Letters Patent are hereby corrected as shown below:

Col. 7, about line 32, paragraph (f) correct the first formula to read $$-CH_2CHO- \atop | \atop CH_2OH$$

Col. 10, correct the last formula at the bottom of the column to read $$\begin{array}{c} Br\ \ Br\ \ CH_3 \\ |\ \ \ |\ \ \ | \\ HC\!=\!C\!-\!C\!-\!OH \\ | \\ C_2H_5 \end{array}$$

Col. 13, line 11, correct the formula to read P 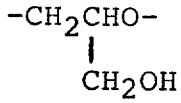₃

Col. 16, line 8, correct the formula to read
    ClP(O) (OCH$_2$CCl=CHCl)$_2$

Col. 32, line 16, after the colon (:), insert  +.

Col. 32, lines 17-18, correct the second formula to read

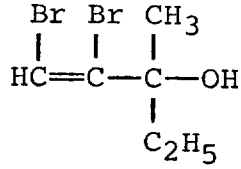(ORCX=CXR')$_2$

Col. 36, line 27, correct "repeatig" to read "repeating".

Signed and Sealed this twenty-fourth Day of February 1976

[SEAL]

Attest:

RUTH C. MASON
Attesting Officer

C. MARSHALL DANN
Commissioner of Patents and Trademarks